US011398080B2

(12) United States Patent
Montgomerie et al.

(10) Patent No.: US 11,398,080 B2
(45) Date of Patent: *Jul. 26, 2022

(54) METHODS FOR AUGMENTED REALITY APPLICATIONS

(71) Applicant: Scope Technolgies US Inc., San Francisco, CA (US)

(72) Inventors: Scott Montgomerie, San Francisco, CA (US); David Nedohin, Sherwood Park (CA); Graham Melley, Sherwood Park (CA)

(73) Assignee: Scope Technologies US Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/121,505

(22) Filed: Dec. 14, 2020

(65) Prior Publication Data

US 2021/0097770 A1  Apr. 1, 2021

Related U.S. Application Data

(60) Continuation of application No. 16/435,977, filed on Jun. 10, 2019, now Pat. No. 10,878,634, which is a
(Continued)

(51) Int. Cl.
*G06T 19/00* (2011.01)
*H04L 65/60* (2022.01)
(Continued)

(52) U.S. Cl.
CPC .......... *G06T 19/006* (2013.01); *G06F 3/1454* (2013.01); *G06F 3/1462* (2013.01); *G06F 40/169* (2020.01); *G09B 5/06* (2013.01);

*G09B 5/125* (2013.01); *G09B 5/14* (2013.01); *G11B 27/34* (2013.01); *H04L 65/601* (2013.01);
(Continued)

(58) Field of Classification Search
None
See application file for complete search history.

(56) References Cited

U.S. PATENT DOCUMENTS 7,729,515 B2  6/2010  Mandella et al.
7,826,641 B2  11/2010  Mandella et al.
(Continued)

OTHER PUBLICATIONS

"Remote AR", Aug. 30, 2015, pp. 1, Retrieved Jan. 23, 2018 from the internet: URL:https://web.archive.org.web/20150830025649if_http://www.scopear.com:80/wp-content/uploads/2015/06/Remote-AR_OneSheet-download.pdf.
(Continued)

*Primary Examiner* — Hilina K Demeter
(74) *Attorney, Agent, or Firm* — Bookoff McAndrews, PLLC

(57) ABSTRACT

A method of interaction using augmented reality includes capturing a first video image using a camera, generating first augmented reality (AR) coordinates corresponding to the first video image, transmitting AR coordinates and first video image to remote user, receiving first video image and annotations from remote user, capturing a second video image using a camera, generating second AR coordinates corresponding to the second video image, and viewing annotations registered to second video image.

25 Claims, 17 Drawing Sheets

Related U.S. Application Data division of application No. 15/090,888, filed on Apr. 5, 2016, now Pat. No. 10,360,729.

(60) Provisional application No. 62/143,611, filed on Apr. 6, 2015.

(51) Int. Cl.
| | |
|---|---|
| *H04W 4/18* | (2009.01) |
| *G06F 3/14* | (2006.01) |
| *G09B 5/06* | (2006.01) |
| *G09B 5/12* | (2006.01) |
| *G09B 5/14* | (2006.01) |
| *G06F 40/169* | (2020.01) |
| *G11B 27/34* | (2006.01) |

(52) U.S. Cl.
CPC ......... *H04W 4/18* (2013.01); *G06T 2219/004* (2013.01); *G06T 2219/024* (2013.01); *G09G 2370/022* (2013.01); *G09G 2380/14* (2013.01)

(56) References Cited

U.S. PATENT DOCUMENTS

| | | | |
|---|---|---|---|
| 7,961,909 | B2 | 6/2011 | Mandella et al. |
| 8,542,219 | B2 | 9/2013 | Carl et al. |
| 8,553,935 | B2 | 10/2013 | Mandella et al. |
| 8,897,494 | B2 | 11/2014 | Mandella et al. |
| 8,970,709 | B2 | 3/2015 | Gonzalez-Banos et al. |
| 9,088,787 | B1 * | 7/2015 | Smith ................. H04N 13/194 |
| 9,189,856 | B1 | 11/2015 | Gonzalez-Banos et al. |
| 9,229,540 | B2 | 1/2016 | Mandella et al. |
| 9,235,934 | B2 | 1/2016 | Mandella et al. |
| 2012/0069051 | A1 | 3/2012 | Hagbi et al. |
| 2012/0249586 | A1 | 10/2012 | Wither et al. |
| 2012/0299962 | A1 | 11/2012 | White et al. |
| 2013/0038632 | A1 | 2/2013 | Dillavou et al. |
| 2013/0063560 | A1 | 3/2013 | Roberts et al. |
| 2013/0065216 | A1 | 3/2013 | Tascon |
| 2013/0174205 | A1 | 7/2013 | Jacobsen et al. |
| 2013/0325970 | A1 | 12/2013 | Roberts et al. |
| 2014/0063061 | A1 | 3/2014 | Reitan |
| 2014/0207417 | A1 * | 7/2014 | Messinger ....... G06Q 10/06311 |
| | | | 702/187 |
| 2014/0223279 | A1 | 8/2014 | Algreatly |
| 2014/0240349 | A1 | 8/2014 | Tuukkanen |
| 2014/0300775 | A1 | 10/2014 | Fan et al. |
| 2014/0310595 | A1 | 10/2014 | Acharya et al. |
| 2015/0074506 | A1 | 3/2015 | Dunn et al. |
| 2015/0169525 | A1 | 6/2015 | Palm et al. |
| 2015/0339453 | A1 | 11/2015 | Richards et al. |
| 2016/0049004 | A1 | 2/2016 | Mullins et al. |
| 2016/0055676 | A1 | 2/2016 | Kasahara et al. |
| 2016/0063706 | A1 | 3/2016 | Gonzalez-Banos et al. |
| 2016/0112479 | A1 | 4/2016 | Jayaraj et al. |
| 2016/0239472 | A1 | 8/2016 | Kasahara et al. |

OTHER PUBLICATIONS

Alberta Innovates—Technology Futures, "Scope AR", Jun. 20, 2014, YouTube, URL: (2 pages).

Carmigniani et al. "Augmented reality technologies, systems and applications", Dec. 14, 2010.

De Crescenzio et al., Augmented Reality for Aircraft Maintenance Training and Operations Support, 2011.

Epson Moverio, "Augmented Reality Training Demonstration—by Scope AR using the Epson Moverio BT-100", Feb. 7, 2013, YouTube, URL: (3 pages).

Epson Moverio, "Epson Moverio BT-200—Interview with Scope AR", Jan. 6, 2014, YouTube, URL: (2 pages).

European Search report dated Feb. 7, 2018 in corresponding European Application No. 16 77 7128.

Henderson et al., Evaluating the Benefits of Augmented Reality for Task Localization in Maintenance of an Armored Personnel Carrier Turret, 2009.

International Search Report dated Jul. 15, 2016 in corresponding PCT Application No. PCT/US16/25994.

Scope AR: "RemoteAR Scenario Promo", Jun. 9, 2015, Retrieved Jan. 24, 2018 from the Internet: URL:https://www.youtube.com/watch?v=o_cD_jVaWJo pp. 2-9.

ScopeAR, "Scope AR's Augmented Reality User Guided Training System", Aug. 28, 2013, YouTube, URL: (2 pages).

ScopeAR, "Scope Technologies Augmented Reality Training Pump Demo", Dec. 18, 2012, YouTube, URL: (2 pages).

ScopeAR, "ScopeAR DemoSummary 01", Nov. 21, 2014, YouTube, URL: (2 pages).

ScopeAR, "ScopeAR ScopeAssist Consumer Concept", Jan. 13, 2014, YouTube, URL: (2 pages).

Wang et al., "Integrating Augmented Reality with Building Information Modeling:Onsite construction process controlling for liquefied natural gas industry" Feb. 12, 2014.

* cited by examiner

METHODS FOR AUGMENTED REALITY APPLICATIONS

CROSS-REFERENCE TO RELATED APPLICATIONS

This patent application is a continuation of and claims the benefit of priority to U.S. application Ser. No. 16/435,977, filed Jun. 10, 2019, which is a continuation of and claims benefit to U.S. application Ser. No. 15/090,888, filed Apr. 5, 2016, now U.S. Pat. No. 10,360,729, which claims benefit of priority under 35 U.S.C. § 119 to U.S. Provisional Patent Application No. 62/143,611, filed on Apr. 6, 2015, the entireties of which are incorporated herein by reference. This application also is related to U.S. application Ser. No. 15/091,207, entitled "Method and Apparatus for Sharing Augmented Reality Applications to Multiple Clients," filed on Apr. 5, 2016 and now issued as U.S. Pat. No. 9,846,972, the entirety of which is incorporated herein by reference.

TECHNICAL FIELD

Various embodiments of the present disclosure relate generally to methods of defining and employing augmented reality ("AR") workflows. More particularly, methods according to the present specification relate to sharing augmented reality ("AR") elements layered on top of real world views between a local user and one or more remote users, e.g., an expert, with the ability for both to interact with and manipulate the same shared elements.

BACKGROUND

In an Augmented Reality (AR) system, a live view of a real-word environment is overlaid with generated content such as sound, text and graphics, etc. The live view may be viewed directly by a user or may be integrated with the generated content and presented to the user. This is in contrast with Virtual Reality (VR) systems in which all visual sensory input and some or all audible sensory input is generated.

The AR environment may be viewed through conventional fixed displays viewed at a distance, portable displays, or semi-immersive to fully immersive wearable displays such as head-mounted displays, eyeglasses, contact lenses, and the like. An AR user experience may be enhanced by tracking the movement and orientation of the display device, thus allowing a shifting view of the real-world environment to be accompanied by AR content kept in correct position and orientation with respect to the real-world view.

In addition, an AR system may allow the user to interact with the generated AR content such as by manipulating generated elements, showing or hiding individual generated elements, and the like. An AR system also may allow the user to add generated elements such as drawings or text annotations to the AR environment.

AR has been applied to many fields of use including architecture, art, construction, education, medicine, entertainment, and tourism, etc.

However, previously known AR systems are limited in that they are directed to augmentation of an entire environment, thus requiring specification of extensive AR environments. In addition, previously known AR systems are limited in their ability to allow multiple users to share a single AR environment or to allow a second user to view and manipulate an AR environment of a first user.

The present disclosure is directed to overcoming one or more of these limitations or other problems in the art.

SUMMARY OF THE DISCLOSURE

According to certain aspects of the disclosure, methods are disclosed for interaction using augmented reality. For example, one method comprises: capturing a first video image using a camera, generating first augmented reality (AR) coordinates corresponding to the first video image, transmitting AR coordinates and first video image to remote user, receiving first video image and annotations from remote user, capturing a second video image using a camera, generating second AR coordinates corresponding to the second video image, and viewing annotations registered to second video image.

According to another aspect of the disclosure, methods are disclosed for interaction using augmented reality. For example, one method comprises: capturing a video image using a camera, generating augmented reality (AR) coordinates corresponding to the video image, updating a scene view according to the generated AR coordinates, encoding video image, loading 3D object information and instructions from external storage, combining the AR coordinates, 3D object information and encoded video frame, and transmitting the combined data to expert.

According to further aspects of the disclosure, methods are disclosed for interaction using augmented reality. For example, one method comprises: receiving combined augmented reality (AR) coordinates, 3D object information and encoded video frame from client, update a background image based on the encoded video frame, updating a scene view according to the AR coordinates, updating positions and existence of the 3D objects, loading 3D content and instructions from cloud storage, creating an updated rendered view by combining the loaded 3D content and the background image, and returning the updated rendered view to the client.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims. As will be apparent from the embodiments below, an advantage to the disclosed systems and methods is that they may allow multiple users to share a single AR environment or a second user to view and manipulate an AR environment of a first user. In addition, the disclosed systems and methods may allow for modeling of a portion of an environment, thereby possibly reducing the cost of deploying such a system or reducing the operating cost of such a system.

It is to be understood that both the foregoing general description and the following detailed description are exemplary and explanatory only and are not restrictive of the disclosed embodiments, as claimed.

As used herein, the terms "comprises," "comprising," or any other variation thereof, are intended to cover a non-exclusive inclusion, such that a process, method, article, or apparatus that comprises a list of elements does not include only those elements, but may include other elements not expressly listed or inherent to such process, method, article, or apparatus. The term "exemplary" is used in the sense of "example," rather than "ideal."

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to systems and methods for sharing Augmented Reality ("AR") elements layered on top of real world views between a local user and one or more remote, e.g., an expert, with the ability for each user to interact with and manipulate the same shared elements. Specifically, embodiments include systems and methods for specifying such an AR environment and systems and methods for user interaction within an AR environment.

Various examples of the present disclosure will now be described. The following description provides specific details for a thorough understanding and enabling description of these examples. One skilled in the relevant art will understand, however, that the present disclosure may be practiced without many of these details. Likewise, one skilled in the relevant art also will understand that the present disclosure may include many other related features not described in detail herein. Additionally, some understood structures or functions may not be shown or described in detail below, so as to avoid unnecessarily obscuring the relevant description.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

I. Overview

Embodiments of the present disclosure relate generally to a method for sharing Augmented Reality ("AR") elements layered on top of real world views between a local user and one or more remote users, e.g., an expert, with the ability for each user to interact with and manipulate the same shared elements. Depending on the mode of use, a local user or remote expert may load AR elements into the fields of view. As the remote expert or local user manipulates the elements, the manipulation may be visible to the other party involved in the session. From the local user perspective, the content may be shown in an AR view, meaning it may be locked into position on the real-world object even as the local user moves around said object. The remote expert may share the same view as the local user even if the remote expert is physically away from the object. Such manipulation, optionally combined with additional communications (such as, e.g., electronic message, audio, video, haptic, still image or other), may be used for applications such as, but not limited to, teaching, training, navigation, operation, or expert advice, etc.

Figure 1:
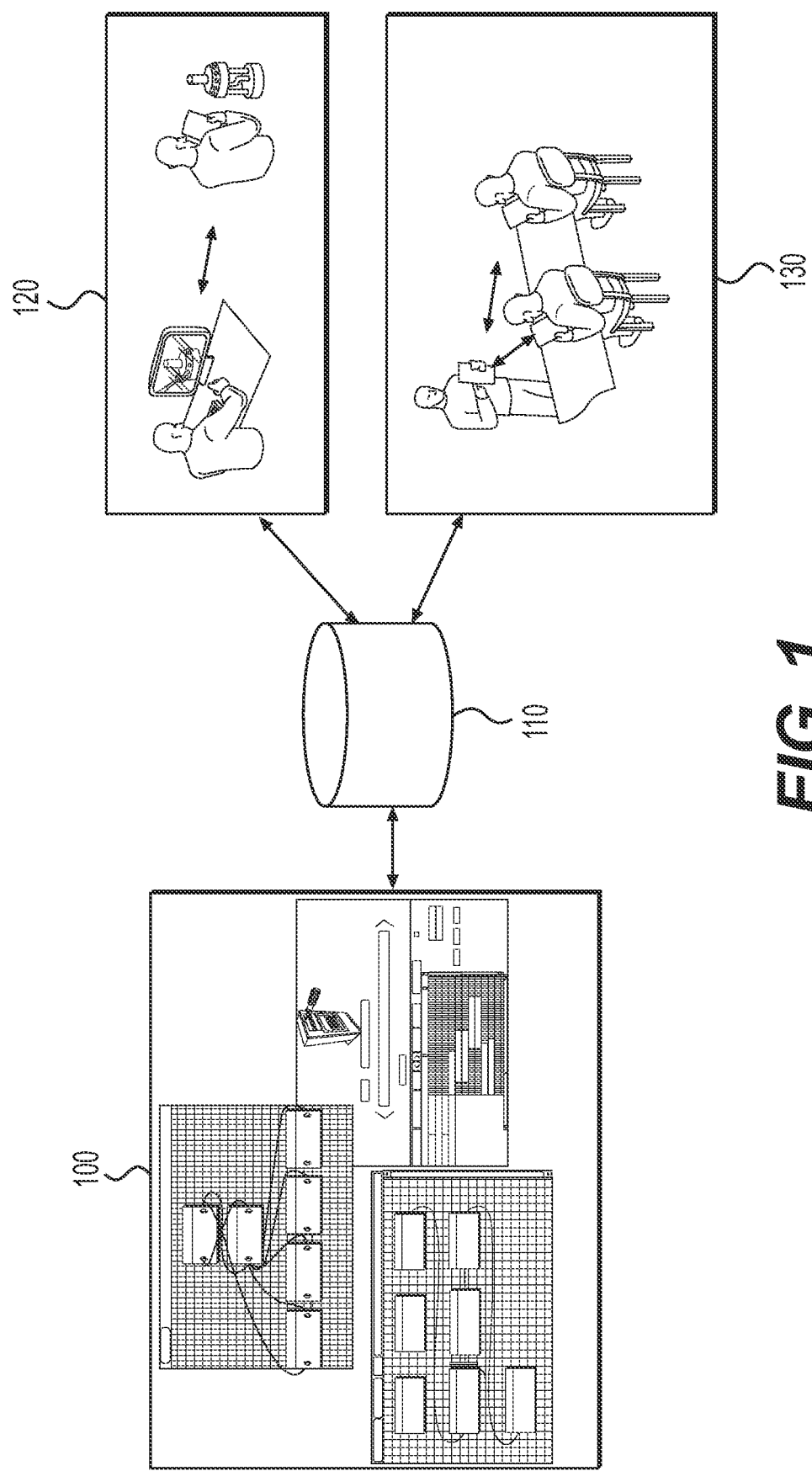
FIG. 1 depicts a system for specifying and deploying a workflow in an augmented reality environment, according to exemplary embodiments of the present disclosure.

For example, as shown in FIG. 1, an AR workflow author may use an authoring environment 100 or software development kit (SDK), such as the "Scope SDK" described in detail below, to specify an AR workflow. The defined workflow may include, for example, definitions of task steps, 3D and 2D objects to be displayed during the task, animations of the 2D and 3D objects, etc. The defined AR workflow may be stored in a network accessible storage 110, which may be a network-attached disk, cloud storage, or any suitable digital storage. The stored AR workflow may be employed in a one-to-one interaction 120 between a local user and a remote expert, such as in Remote AR discussed in detail below. Alternatively, the stored AR workflow may be employed in a one-to-many interaction 130 between an instructor and multiple students, such as in Instruct AR discussed in detail below.

Embodiments of the present disclosure may provide a combination of simple authoring with tools designed for augmented reality, such as the authoring environment 100 of FIG. 1. Previously known systems were designed with full virtual rooms in mind. In contrast, embodiments of the present disclosure may be quick, intuitive, and minimalist. In particular, a content author may typically only interact with a subset of parts comprising a machine. Accordingly, a fast and intuitive method of adding tooling animations, may be provided by embodiments of the present disclosure, and may allow content authors to quickly author content.

In certain embodiments, the disclosure pertains to, among other things, a shared state of augmented reality, that is, a shared state of overlaying 3D objects on a field user or technician's true field of view generated by an imaging device such as a camera, as well as the ability to share that reality by replicating the camera feed along with the 3D objects and their positions, and application between the field technician and a remote expert, such as the one-to-one interaction 120 of FIG. 1 or the one-to-many interaction 130 of FIG. 1. Another embodiment of the present disclosure may include an ability to interact with this content (e.g., the shared state of augmented reality) in real time (or near-real time) such that both the local user and remote expert may see the content and share over a variety of connectivity levels. Embodiments of the present disclosure may further include recording and later viewing the above-described shared state of augmented reality. In addition, embodiments of the present disclosure may further include recording of metadata associated with user actions within the AR session, perhaps including participants, time for completion of tasks, and other various data such as measurements, check list items, screenshots, etc. Such data may be stored in any suitable storage device, such as a storage device local to a participant in the AR session, a network-accessible storage device, a cloud service, etc. Such recorded data may be used, for example, to visualize this data to improve procedures and efficiency, for training purposes, or for any other suitable purpose.

In some embodiments, the shared state of augmented reality may be manipulated by, for example, drawing upon the remote expert's screen using a mouse, digital pen, finger or other such pointing device. The path traced using the pointing device is then reflected upon the local user device, in the location within the AR environment in which it was originally drawn. As the local user view is moved within the environment, the traced path remains in place relative to the original view position and appears locked onto the object the local user is working on.

In other embodiments, 3D content, and other content (text or rich media such as images, audio or video) may be loaded from a cloud storage service. The content there may be authored from a content tool or software development kit (SDK) (such as the "Scope SDK" discussed below), or may be loaded directly from known computer-aided design (CAD) file formats. These CAD models also could be automatically downloaded by the local user upon using computer vision to recognize an object such as in FIGS. 14 and 15 discussed in more detail below. For example, when recognizing the housing of a pump assembly, a model of the pump assembly may be downloaded from a cloud service and overlaid directly on the physical pump. With the Scope SDK, animations and workflows may be built into the metadata stored on the cloud service; these animations, thus, may be available for the field technician to view. The expert also may control and manipulate such animations once loaded into the shared viewing space of the local user and expert, in order to, for example, illustrate new procedures and manipulations.

The SDK also may define a set of standard tools (e.g., wrenches, screwdrivers, etc.) that may be loaded by the remote expert to the local user or vice versa. These tools then may be associated with physical objects to illustrate movements such as, for example, removing a nut. This may be done, for example, by using computer vision object recognition to recognize the shape of the nut, and using mesh analysis to discover the correct angle of address of the tool, as discussed in more detail below.

The local user and remote expert apparatus used in embodiments of the present disclosure may include computers, tablets, smart phones, AR glasses or other such devices equipped with a camera and display, and perhaps including suitable audio components such as speakers and/or microphones, etc. The local user and remote expert apparatus may be, but need not be, of the same type of device. The remote expert may act as a server, accepting and managing incoming connections from a local user or possibly multiple local users simultaneously. The local user may act as a terminal, possibly connecting to the server (either locally or remotely) and possibly transmitting image data to the server. This relationship also may be reversed, such that the local user may act as a server if needed.

In one or more embodiments, the remote expert may manage multiple local user connections, and may store AR details for each local user. The local user connections may be simultaneous or sequential. In instances of multiple simultaneous connections, the remote expert may be able to switch between local users, and may update and interact with each local user individually. This allows a single expert, for example, to assist many local users at once in a one-to-many relationship, as discussed in greater detail below. One or more embodiments may allow multiple remote experts (e.g., technical experts) to interact with one or more local users.

In another embodiment, the remote expert may control the level of detail being received from the local user camera. For example, the remote expert may request still snapshots from the local user camera. This remote expert could then, for example, use this snapshot to zoom in on particular details of the local user image.

In another embodiment, the remote expert may be able to annotate upon the display of the local user using text or other drawings. This text may be locked to a particular point in the local user's frame of reference, and not based upon coordinates in the view itself. For example, if the remote expert were to select an object in the local user's view and annotate the object, when the local user moves the field of view of the camera, the annotation may remain with (or otherwise track) the object rather than remaining in the same position on the screen. In other embodiments, the annotation may not track the object and instead may remain in the same position on the screen, regardless of the local user's field of view so as to not change position or orientation according to movement of the local user device.

In another embodiment, instead of a one-to-one relationship between local user and remote expert, multiple remote experts may see the field of view and interact with a single local user.

In additional embodiments, the remote expert and the local user may be determined at point of contact between remote experts connecting across a network, thus allowing for a global virtual network of individuals, each of whom may have the capacity at any time to be accessed as an expert, or to take advantage of accessing any other expert. In this form, each individual may be tagged with metadata describing one or more useful skill sets of the individual. In such embodiments, participants requiring assistance may filter the connected population to meet their current specific needs.

II. Usage Scenarios

Embodiments of the present disclosure may include multiple usage scenarios. Such usage scenarios may include, for example, an expert who may share a view of a local user within an AR environment and perhaps provide technical assistance to the local user. This scenario is discussed in detail below as "Remote AR." Such usage scenarios also may include, for example, an expert instructor who may provide instruction to one or more local users, each of whom may share the view of the expert instructor. This scenario is discussed in detail below as "Instruct AR."

Figure 20:
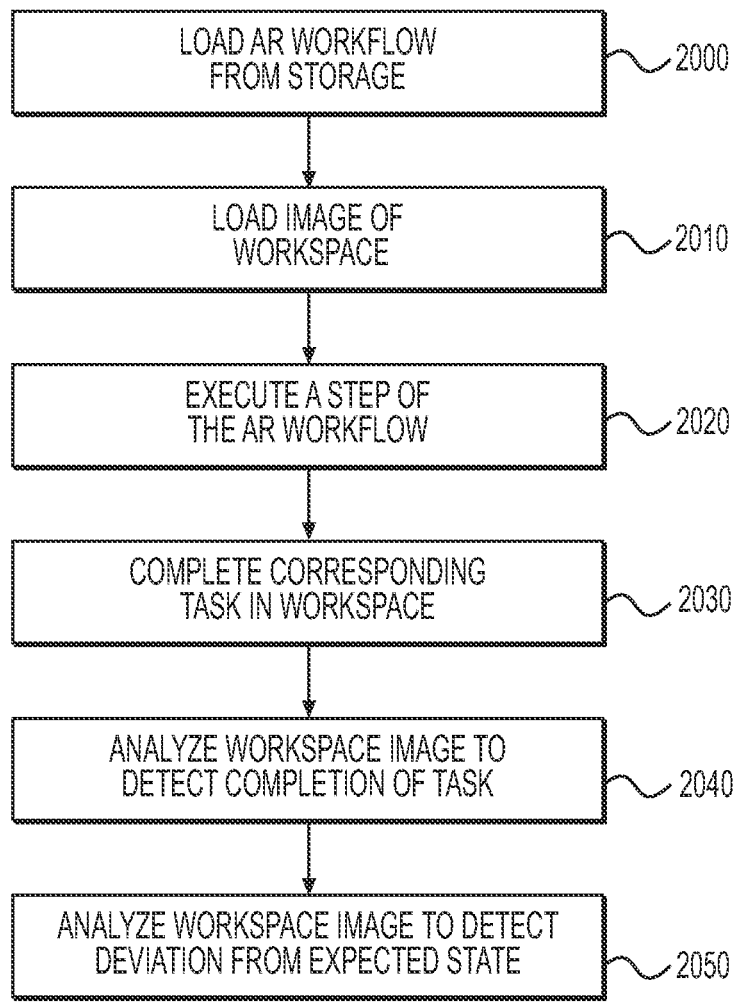
FIG. 20 depicts a flowchart of an additional exemplary method for interaction using augmented reality, according to exemplary embodiments of the present disclosure.

An exemplary method of AR interaction according to embodiments of the present disclosure, as shown in FIG. 20, may include loading an AR workflow from storage (2000), loading an image of a workspace from a camera (2010), executing a step of the AR workflow (2020), completing a task corresponding to the workflow step in workspace (2030), analyzing a workspace image to detect completion of the task (2040), and analyzing the workspace image to detect deviation from an expected state (2050).

Figure 21:
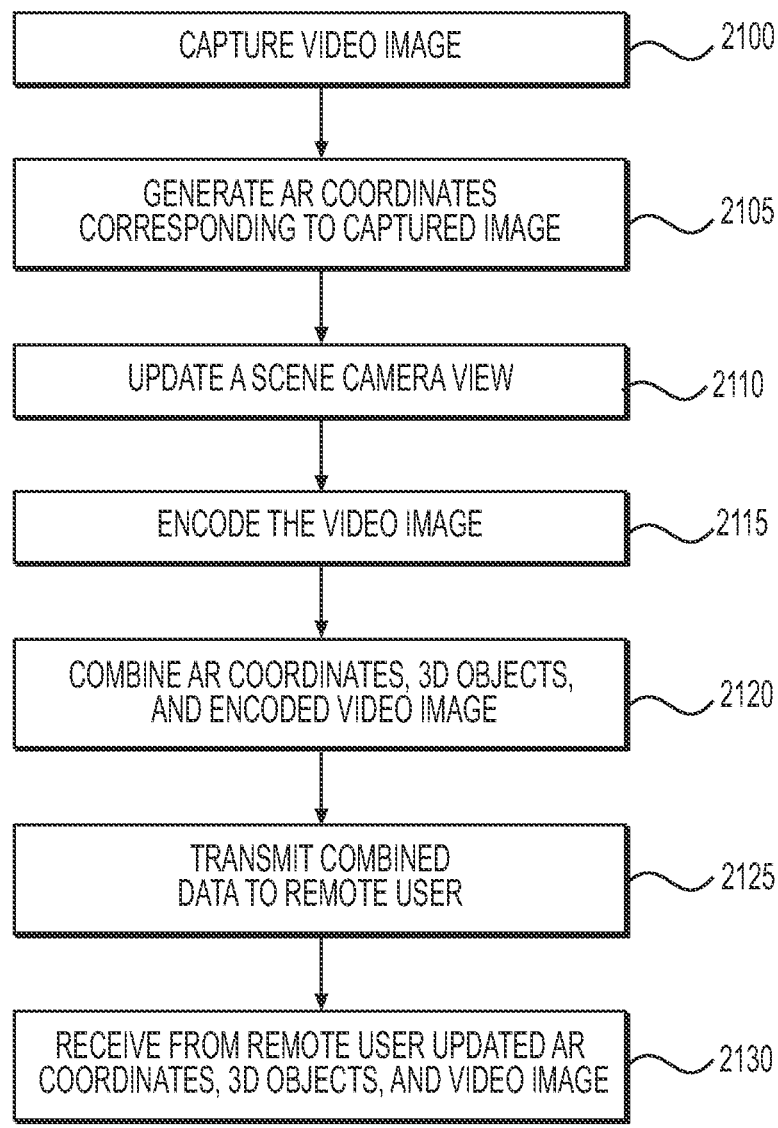
FIG. 21 depicts a flowchart of another exemplary method for interaction using augmented reality, according to exemplary embodiments of the present disclosure.

An alternative exemplary method of AR interaction according to embodiments of the present disclosure, as shown in FIG. 21, may include capturing a video image by a camera (2100), generating AR coordinates corresponding to captured video image (2105), update a scene camera view (2110), encoding the video image (2115), combining the AR coordinates, 3D objects, and encoded video image (2120), transmitting the combined data to a remote user (2125), and receiving from the remote user updated AR coordinates, 3D objects, and video image (2130).

a. Remote AR

Figure 2:
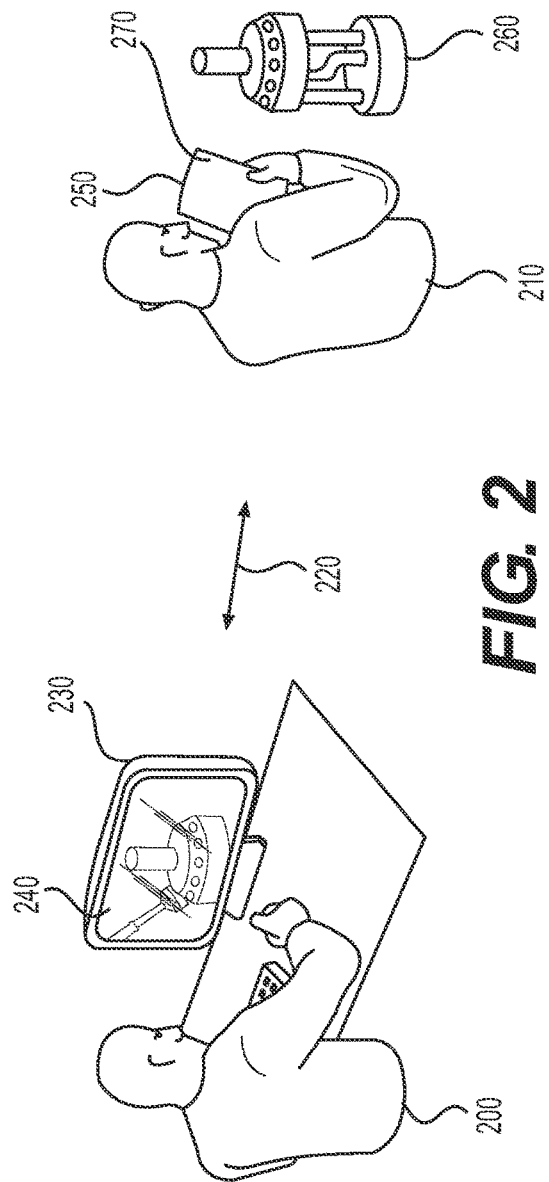
FIG. 2 depicts interaction between an expert and a field technician through augmented reality, according to other exemplary embodiments of the present disclosure.

In one or more embodiments, an expert may share a view of a local user within an AR environment and may provide technical assistance to the local user, as shown in FIG. 2. In such embodiments, the remote expert 200 may upload and overlay additional content 240 on remote camera display (230), possibly in real time or in near real-time. The overlay content 240 may include, for example, 3D models, freehand, drawing, caption text, documentation (manuals etc.), etc. The local user 210 may provide a visual backdrop for the overlay content 240 via a camera device 250 associated with display device 270. The local user 210 may further provide a 3d reference system (via AR calculation) for both users.

Display devices 230 and 270 used by the remote expert 200 and the local user 110 may be, for example, a tablet, mobile phone, laptop computer, head-mounted display, etc.

In one or more embodiments, either or both of the remote expert 200 and the local user 210 may generate and manipulate overlay content 240. In addition, the local user 210 may be free to move around and view subject 160 from any perspective. In such case, an AR environment may allow overlay content 240 to "stick in place" so as to remain with (or otherwise track) an object displayed on the local user display device 270 rather than remaining in the same position on the screen of the local user display device 270.

Remote expert 200 and local user 210 may share a live connection 220 in a network such as the Internet and may also share audio, video, data, etc.

In one or more embodiments, Remote AR may provide the benefits of both videoconferencing and augmented reality applications. Thus, rather than simply combining these two technologies in a wholesale fashion, embodiments may provide methods and apparatus for combining multiple aspects that may be suitable for particular applications. Such multiple aspects may include, for example, video encoding software, networking software, 3D renderer for rendering 3D objects, and augmented Reality software to analyze a live video image, and keep 3D objects aligned to that video image in real time.

Figure 17:
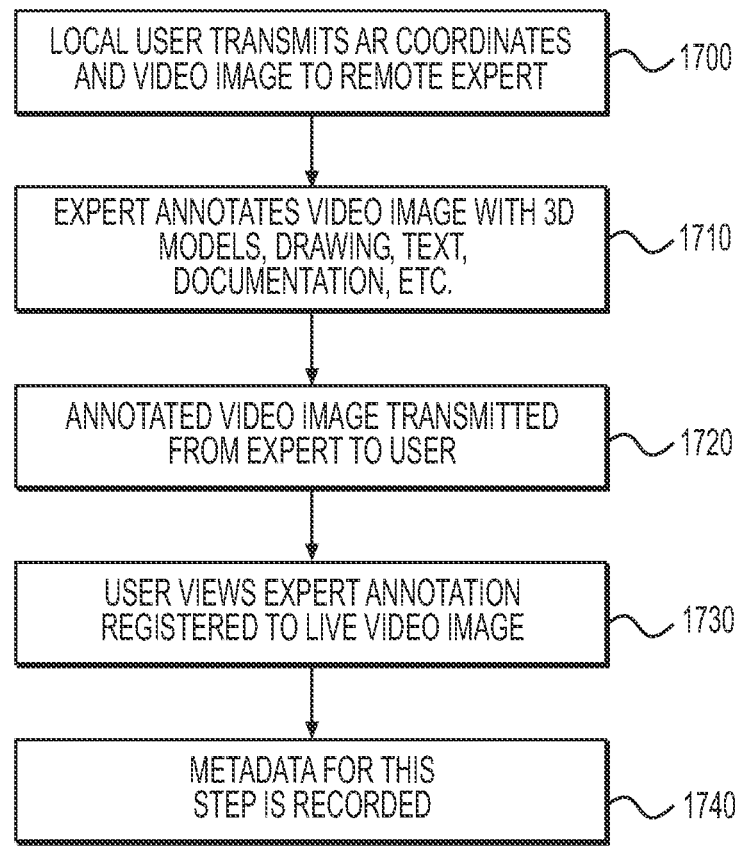
FIG. 17 depicts a flowchart of an exemplary method for interaction using augmented reality, according to exemplary embodiments of the present disclosure.

According to embodiments of the present specification, method of interaction using augmented reality, as shown in FIG. 17, may include transmitting AR coordinates and video image from local user to remote expert (1700), expert annotates video image with 3D models, drawing, text, documentation, etc. (1710), annotated video image is transmitted from expert to user (1720), user views expert annotation registered to live video image (1730), and metadata for this step of the interaction is recorded (1740).

Figure 18:
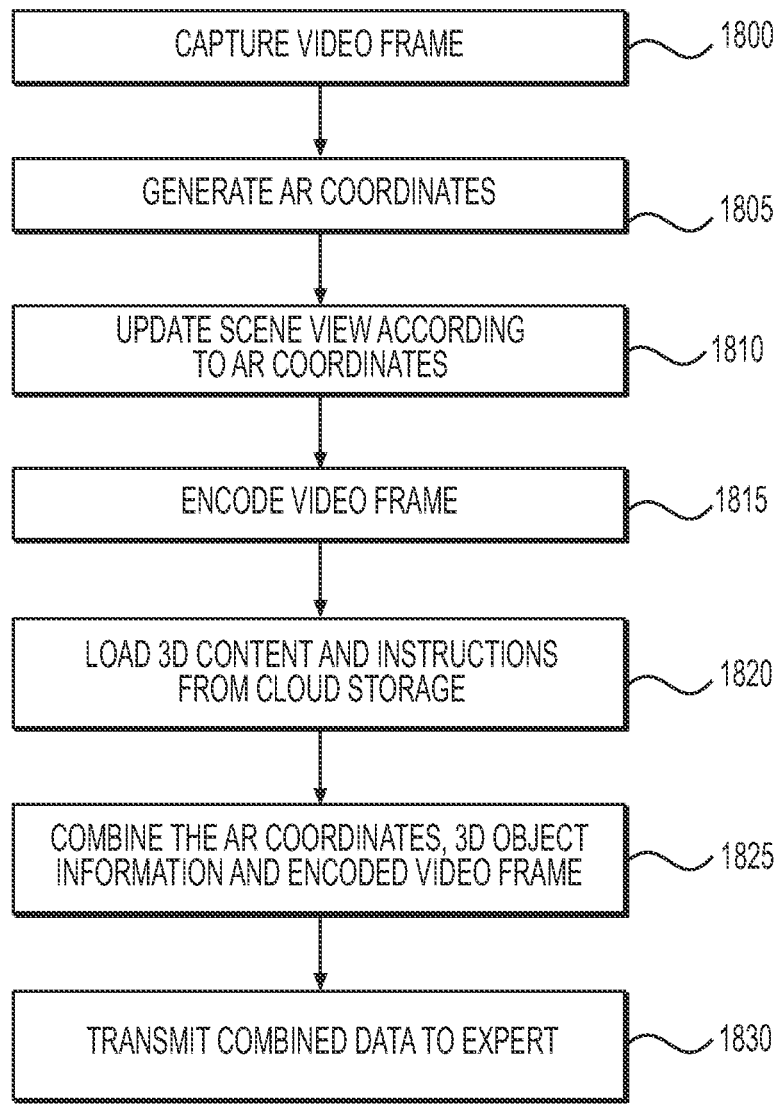
FIG. 18 depicts a flowchart of an exemplary method for interaction using augmented reality, according to exemplary embodiments of the present disclosure.

According to embodiments of the present specification, method of interaction using augmented reality, as shown in FIG. 18, may include capturing a video frame (1800), generating AR coordinates (1805), updating a scene view according to the AR coordinates (1810), encoding the video frame (1815), loading 3D content and instructions from cloud storage (1820), combining the AR coordinates, 3D object information and encoded video frame (1825), and transmitting the combined data to an expert.

Figure 19:
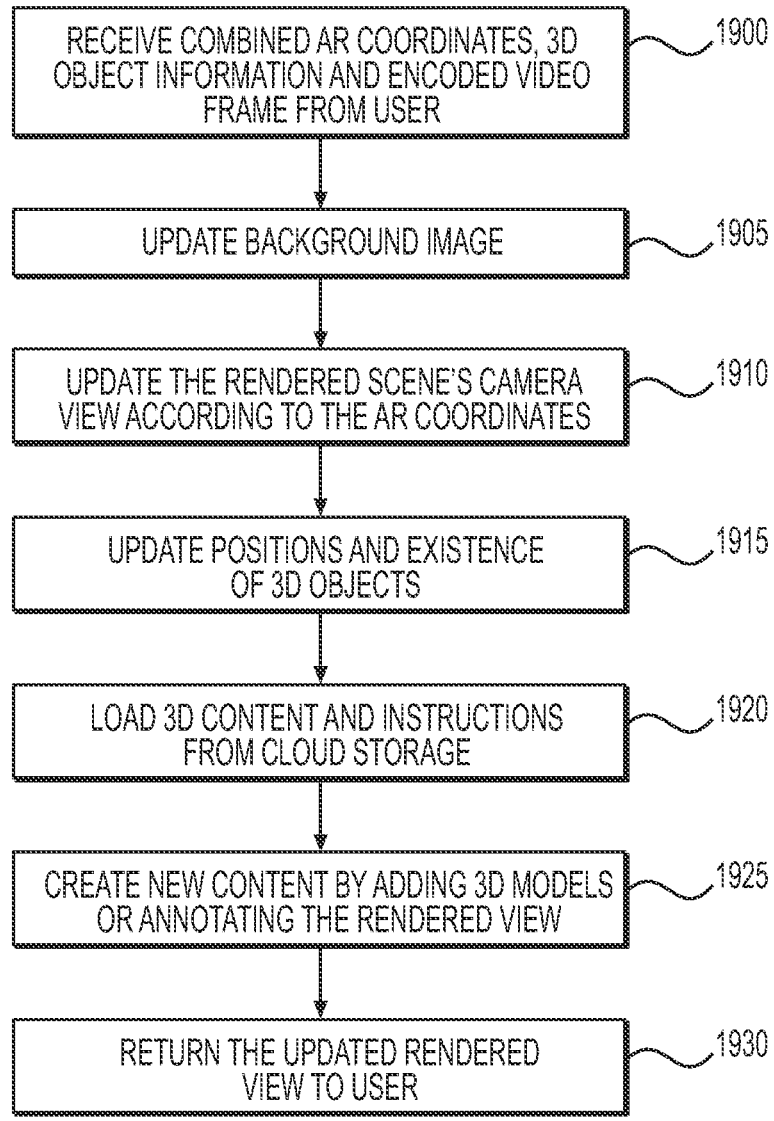
FIG. 19 depicts a flowchart of an exemplary method for interaction using augmented reality, according to exemplary embodiments of the present disclosure.

According to embodiments of the present specification, method of interaction using augmented reality, as shown in FIG. 19, may include receiving combined AR coordinates, 3D object information and encoded video frame from user (1900), updating a background image (1905), update the rendered scene's camera view according to the AR coordinates (1910), updating the positions and existence of 3D objects (1915), loading 3D content and instructions from cloud storage (1920), creating new content by adding 3D models or annotating the rendered view (1925) and returning the updated rendered view to the user (1930).

b. Instruct AR

Figure 3:
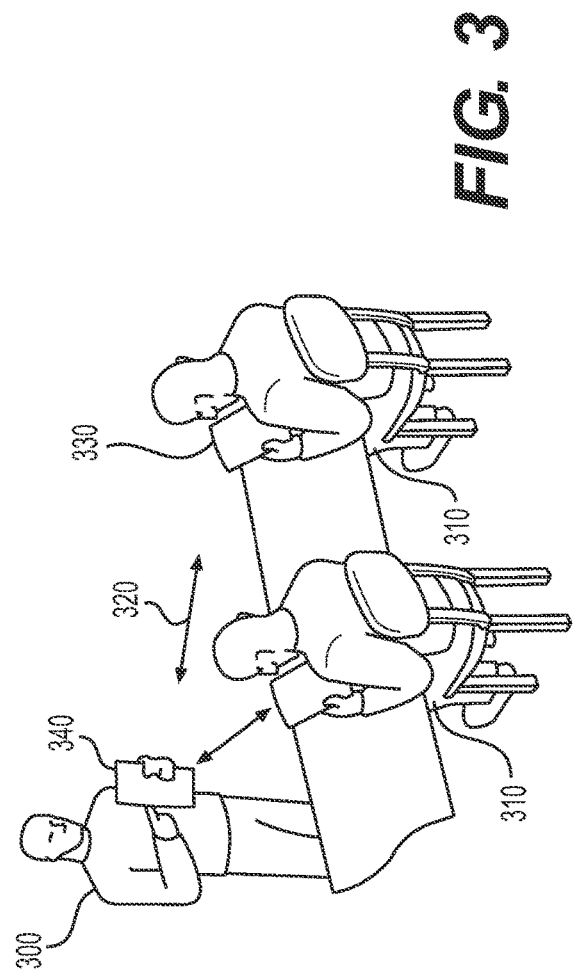
FIG. 3 depicts interaction between an instructor and multiple students through augmented reality, according to further exemplary embodiments of the present disclosure.

Another embodiment of the disclosure pertains to sharing the state of a 3D scene, but without replicating the camera. Such embodiments, for example Instruct AR, as shown in FIG. 3, may relate to scenarios such as master-local user or instructor-student, etc. The instructor may look at a marker or some point of reference (potentially even one generated live at runtime) on which to display a 3D overlay through a device equipped with a camera such as, for example, a tablet or glasses, or the like. The student also may look at a similar point of reference, with the same 3D overlay. The instructor then may be able to control the content displayed to the student—for example by rotating or zooming the content, drawing on it, or otherwise enhancing it to illustrate. The instructor and student may be networked together over the internet (or suitable network), and thus the instructor may provide instruction to the student in an immersive fashion, possibly without being co-located. In such a scenario, the instructor may have a 1:1 relationship with a student, or potentially a one-to-many relationship in which the instructor's view may be shared to multiple student, such as an entire classroom, or, potentially, to a very large virtual classroom distributed across the breadth of a network such as, e.g., the internet or wide access network, etc.

In one or more embodiments, one or more students may share a view of an instructor within an AR environment and may receive instruction from the instructor, as shown in FIG. 3. Student devices 330 used by students 310 may use local cameras to provide visual backdrop and 3D reference system for that user or may share a camera view provided by the instructor device 340 used by the instructor 300.

III. Operating Environment

Embodiments of the present disclosure may operate in an environment comprising a development platform (e.g., Scope SDK), Expert and remote view for Remote AR, and instructor and student view for Instruct AR.

a. Scope SDK

The Scope SDK may provide software tools to support creation of step-by-step visual instructions in Augmented Reality (AR) and Virtual Reality (VR). Components of the Scope SDK may include a user interface for easily creating a workflow, which will be described below with reference to FIGS. 6-10. In one or more embodiments, each workflow item presented in the user interface may represent a set of 3D models illustrating parts, combined with rich media (images, videos), animations (movement of 3D models/parts) and textual information. A user interface may be provided for selecting content (3D models, images, videos, text) to illustrate the step-by-step visual instructions.

A user interface according to embodiments of the present disclosure may allow for creating content quickly by rapidly identifying common part items such as nuts, rivets or screws, and associating them quickly with tools such as wrenches, screwdrivers, or drills. Aligning tools with parts is one of the most common tasks in how-to development, and poses a significant challenge in 3D content development.

Embodiments of the present disclosure may allow a user to describe tools in terms of meshes, and specify certain points in that mesh which interact with points in other meshes (this is described in greater detail with respect to FIGS. 11 and 12 below). For example, four points on a wrench may be enough to describe the "box" that would interface with a "box" on a nut, thus possibly providing an easily generalizable way to interface with various wrench types and nut types. Similar generalizations may be available for other tools requiring interfacing between tool and part.

Embodiments of the present disclosure may further define a minimum viable set of constraints (defined by points and angles) to ascertain interaction between a tool and other hardware in a generalizable way. Screwdrivers, wrenches, drills, hammers, and many other tools have a minimum number of points that need to be described to enable interaction. For example, a hammer may require three points to describe a surface, and another three points to describe the impact surface. A wrench may require four points to define the "box" and angle of entry, while the nut may require three points to define the box and angle of entry. A screwdriver and drill may be modeled as variations of a wrench.

Embodiments of the present disclosure may further provide mechanisms for storing and transmitting data defining an AR interaction. For example, such information may be stored in an XML schema and data structure or other suitable data structure. Such data may be stored in a storage device local to a development work station or to a user or may stored in a network accessible storage. Alternatively, such data may be packaged and uploaded to a cloud server. Data stored in any of these modes may be downloaded and unpacked from the storage to an end user's physical device (laptop, phone, tablet, digital eyewear, etc.).

b. Remote AR

Figure 4:
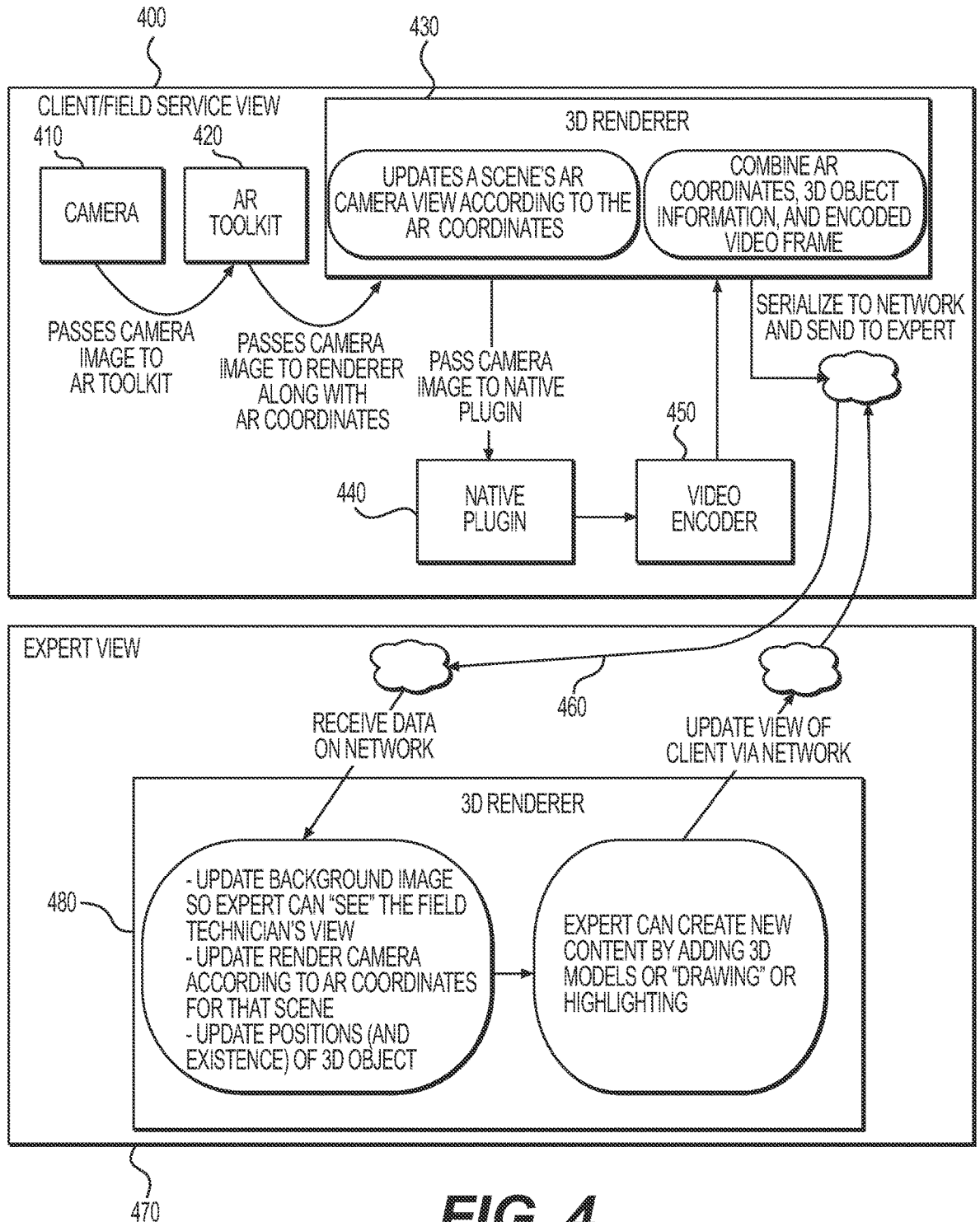
FIG. 4 depicts an exemplary augmented reality environment for interaction between an expert and a field technician, according to exemplary embodiments of the present disclosure.
Figure 16:
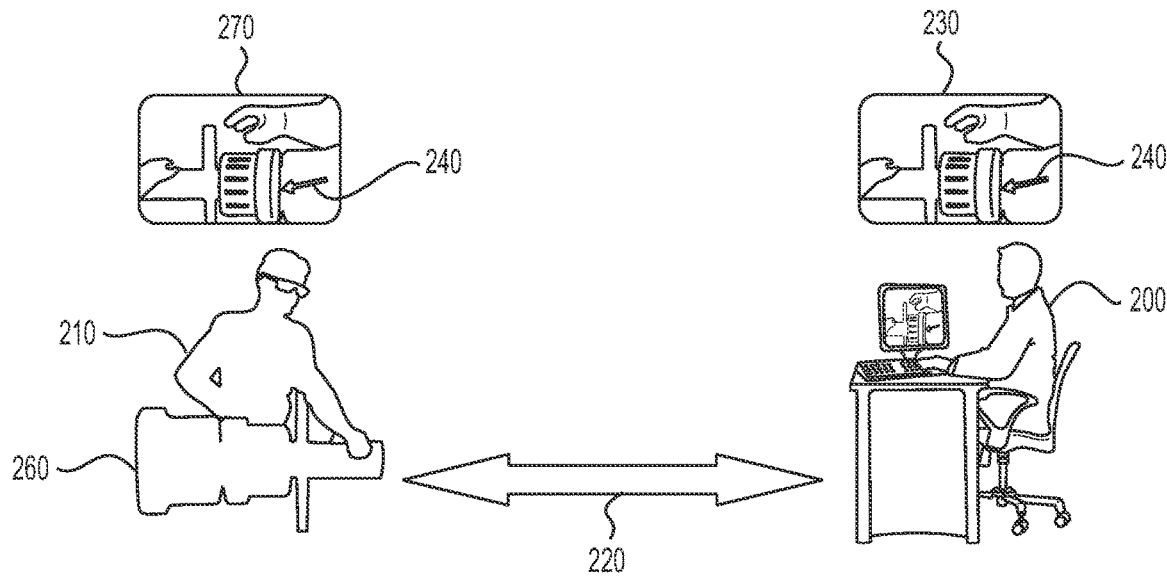
FIG. 16 depicts an exemplary augmented reality environment for interaction between an expert and a field technician, according to exemplary embodiments of the present disclosure.

An operating environment for Remote AR according to one or more embodiments of the present disclosure may include a "Local user/Field service" view 400 and "Expert" view 470 as shown in FIGS. 4 and 16.

As shown in FIG. 4, in the "Local user/Field service" view 400, which may operate on a hardware device controlled or operated by a local user, a camera 410 may pass a camera-generated image to the AR toolkit 420 and the AR toolkit 420 may generate AR coordinates and pass the camera image and generated AR coordinates to a renderer 430. The renderer 430 may update an AR scene's camera view (that is, the virtual camera that renders 3D objects within the AR scene, not the physical camera 410) according to the AR coordinates. The renderer 430 may pass the camera image to a native plugin 440, which may be running on a computing device, such as a device running an operating system such as, for example, iOS, Android, OSX, Windows, etc. The native plugin 440 may pass the camera image to a video encoder 450, which may pass an encoded video frame back to the renderer 430. The renderer 430 may then combine the AR coordinates, 3D object information and encoded video frame and may serialize the combined data to pass to the "Expert" view 470 by way of the network 460.

As shown in FIG. 4, in the "Expert" view 470, which may operate on a hardware device controlled or operated by a remote expert, a 3D renderer 4380 may receive the serialized combined data from the 3D renderer 430 by way of the network 460. Upon receiving the serialized data, the 3D renderer 480 may update a background image such that an expert may see a field service technician's view from the "Local user/Field service" view 400. The 3D renderer 480 may then update the rendered scene's camera view according to the AR coordinates for that scene, and may update the positions and existence of 3D objects in the scene. The expert can create new content by adding 3D models or annotating the rendered view through drawing, highlighting or other annotations, and the updated rendered view is returned to the "Local user/Field service" view 400 by way of the network 460.

In an alternative embodiment of the present specification, the remote expert 400 may have a Virtual Reality (VR) view of the local user's environment. For example, the local user camera 410 may be a depth camera, where in addition to the image pixels that are captured, a depth pixel is also captured, providing 3D information in each pixel. When the local user moves around, an algorithm may be used to combine this information, thus building a 3D map of the local user's environment, or in particular, a piece of equipment.

The combined 3D image and depts. data may be transferred to the remote expert, who may view the data with a 3D VR device. The remote expert may then "see in 3D", in VR, as more information from the local user is transferred to the expert. The local user may, thus, interact with this 3D environment, for example, by placing new 3D content, and because the remote expert may also view the content in a 3D environment, the remote expert may rotate the remote expert's view to see the local user's 3D environment and interact with it. This interaction may include placement of 3D information, models, tools, etc.

FIG. 16 depicts an alternative view of an exemplary augmented reality environment for interaction between an expert and a field technician such as the environment of FIG. 2.

c. Instruct AR

Figure 5:
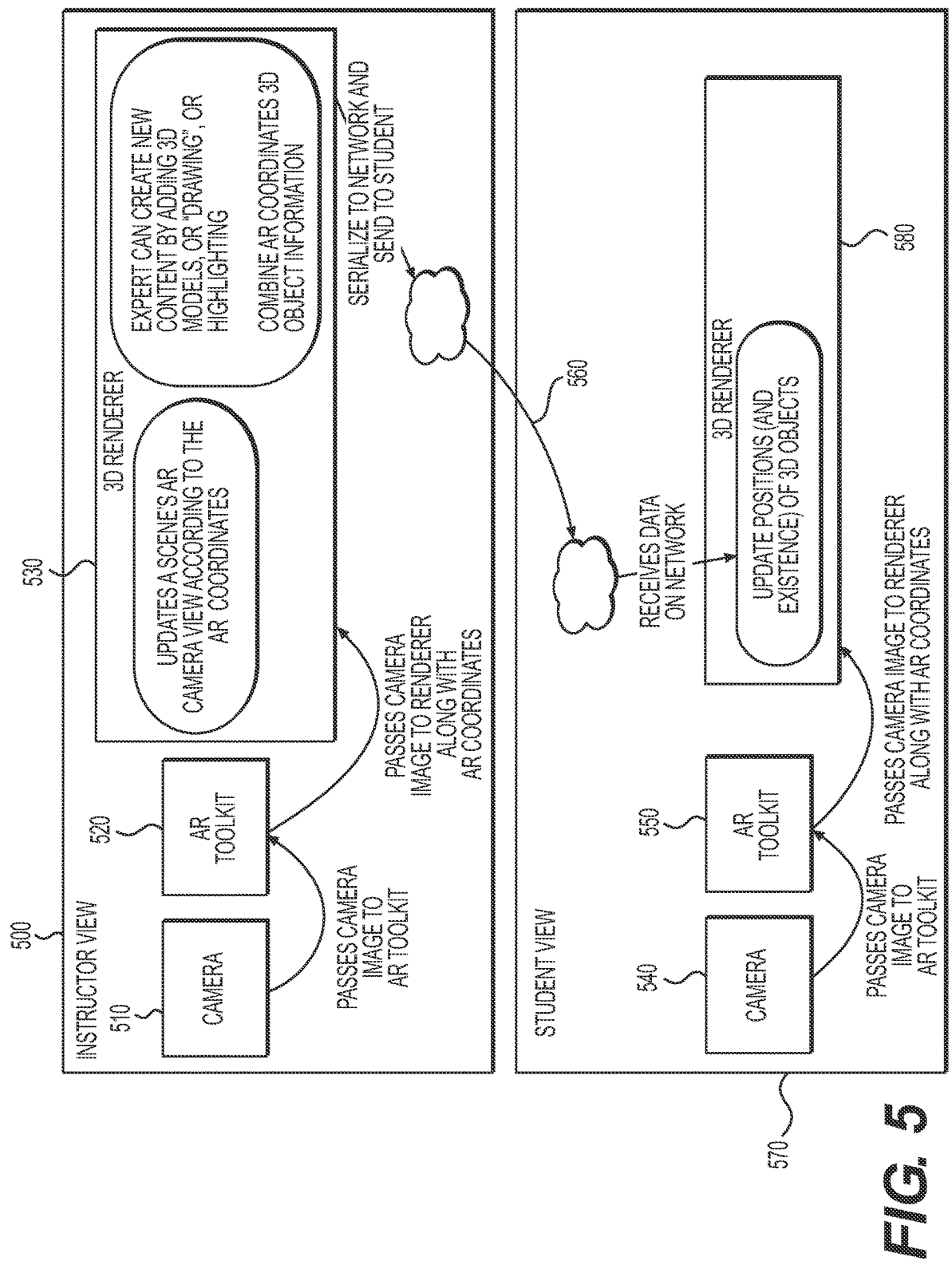
FIG. 5 depicts an exemplary augmented reality environment for interaction between an instructor and multiple students, according to exemplary embodiments of the present disclosure.

An operating environment for Instruct AR according to one or more embodiments of the present disclosure may include an "Instructor" view 500 and a "Student" view 570, as shown in FIG. 5.

As shown in FIG. 5, the "Instructor" view 500 may include a camera 510, an AR toolkit 520, and a renderer 530.

As also shown in FIG. 5, the "Student" view 570 may include a camera 540, an AR toolkit 550, and a 3D renderer 580.

The "Instructor" view 500 and the "Student" view 570 may communicate by way of the network 560.

IV. Defining a Stored AR Interaction

In one or more embodiments, an XML schema (or any other suitable data structure) may be used to store, retrieve, or otherwise process data for a scene, or expected set of elements. When these elements are located in the local user's view, such as the "Local user/Field service" view 300 of Remote AR or the "Student" view 570 of Instruct AR, a preset sequence of AR events may be displayed based upon instructions stored in the XML data. For example, an AR sequence for disassembling an electric motor could be stored in such XML data. When the motor is identified in the local user's view, the sequence then may be overlaid and initiated, displaying as described in the XML data.

V. Deployment

Information from the Scope SDK may be deployed across a variety of devices, including, for example, tablets, desktop computers, phones, and smart glasses, etc. This information may contain details on how to perform one or more steps in a procedure. Moving from step to step may be achieved in a variety of ways—for example, via a simple interface such as buttons; voice control with simple commands such as "next" or "back", or in the case of a branched workflow via speaking choices listed as commands; gesture recognition whereby a camera may be used to detect hand signals or other gestures; or computer vision techniques that may be able analyze the image to detect real-time state changes. The latter may include detecting that a part was successfully removed, or for example, that a part shows signs of rust damage. Alternatively, such detection may include data events, such as gathering data from a real-time data provider, or internet of things integration to detect changes in state, such as temperature, pressure, etc. With this detection algorithm, it may be possible to guide a worker through repair procedures without extensive training.

According to embodiments of the present disclosure, the system may be constantly monitoring for state changes, and may generate events for specified state changes. In the authoring platform discussed below, a user may create a decision branch tree or link mechanism, and the decision or link may be associated with such an event. Such a mechanism may be associated with a step in a defined AR interaction. For example, the user may create a step that would force the system to check state, or respond to a state change by moving to another step.

Thus, according to embodiments of the present disclosure, a workflow could be designed to detect deviations in expected values in the field. For example, on a certain step after a workflow was completed, a pressure sensor may expect a certain range of values, and if a detected value were outside of this range of values, a warning could be triggered, and could modify the workflow to force the user to remedy the problem associated with the pressure sensor.

A variety of ways of creating this detection algorithm may be possible. For example, training the algorithm through analyzing recorded imagery of previous procedures, where each procedure is identified and annotated with indications of alternative behavior. For example, in the case of rust being detected, analyzing a number of videos of a procedure being performed in which a subset of those detect rust. The cases detecting rust may then follow a separate workflow path. In one or more embodiments, a machine learning algorithm may be employed to learn this behavior.

Alternatively, this detection algorithm my be created manually by a human, by manually annotating parameters for which the algorithm should detect deviations and suggest alternative steps to correct the problem.

Detection of a successful completion of procedure may also be required. According to one or more embodiments, this may be accomplished with computer vision, by detecting that an assembly had been correctly assembled. Alternatively, integration with various data sources may indicate that a system was functioning correctly, for example by reading a voltage or pressure within specified parameters.

According to one or more embodiments, upon completion of a procedure (whether this completion was detected by the technician or an algorithm), integration with a tool for managing service calls or a Customer Relationship Management tool may be employed to automatically report information about the procedure, for example video and audio recordings, still images, measurements, time and location data, part numbers used or modified, among other information gathered from the procedure.

VI. Scope SDK User Interface

One or more embodiments of the present disclosure may provide an interactive environment or software development kit (SDK) for specifying aspects of an AR interaction, such as the AR interactions conducted within the environments depicted in FIGS. 3 and 5, referred to here as the "Scope SDK." The Scope SDK may be used by a workflow developer to specify an AR workflow that may be used with a local user-remote expert or student-instructor scenario, such as discussed above.

The Scope SDK may include a hierarchy of editing tools to define an AR interaction at various levels. These levels may include a project level, a sequence level, and a step level. The step level may include step properties and animation properties. The Scope SDK user interface will be described in more detail below with respect to FIGS. 6-10.

a. Project Editor

Figure 6:
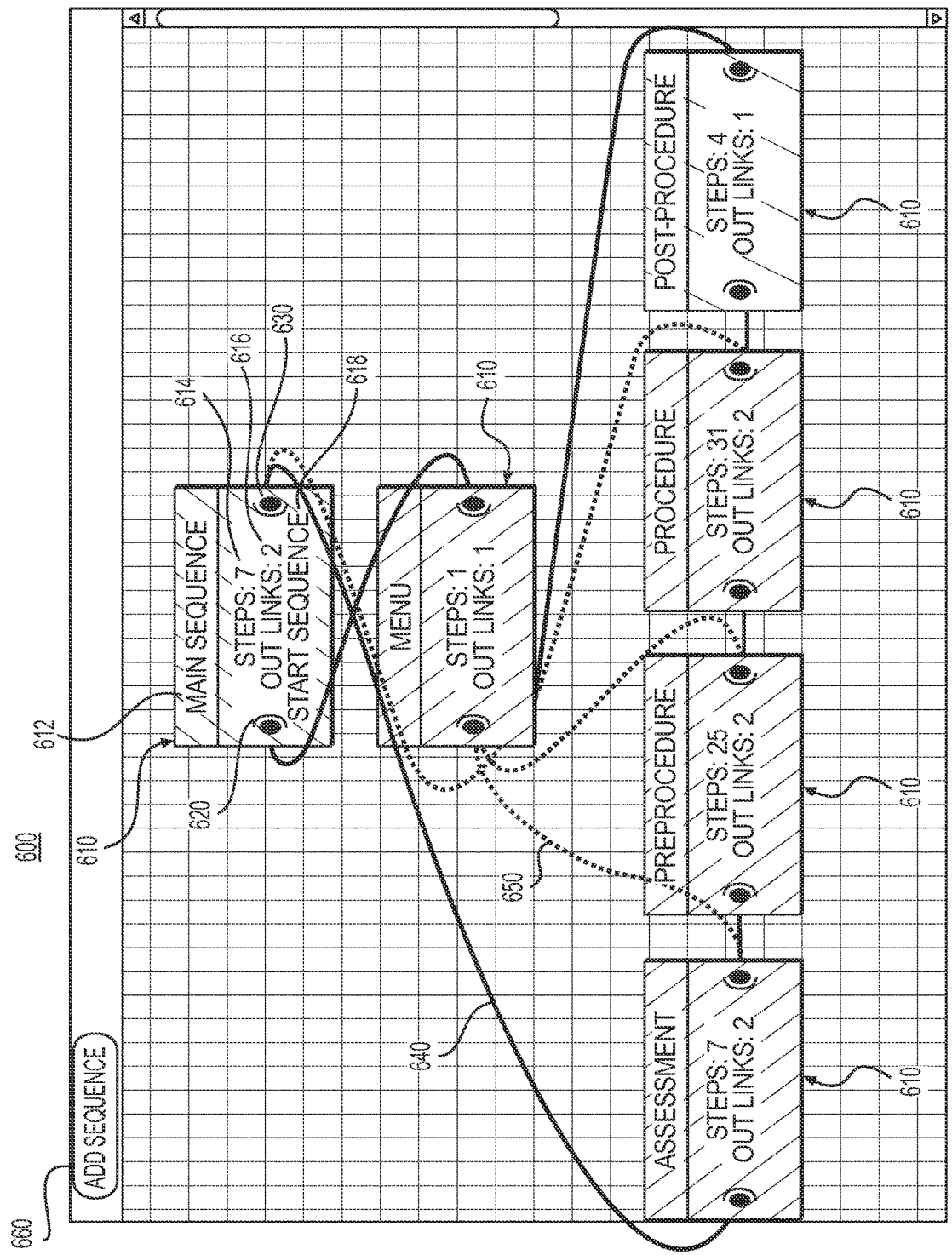
FIG. 6 depicts an exemplary user interface for specifying an augmented reality interaction, according to exemplary embodiments of the present disclosure.

As shown in FIG. 6, a "Project Editor" 600 may be the top level of interactive visual control in the Scope SDK.

The boxes 610 shown within the editor 600 each may represent a discrete Sequence in the Scope AR project, which may be analogous to a chapter in a book. Contained within each box 610 may be information describing each sequence, such as the title of the sequence (612), the number of steps within the sequence (614) and the number of outgoing links from that sequence (616). The start sequence also may be identified as such (618).

Each sequence 610 may be freely positioned in the grid so as to, for example, allow for the author's personal preference in visualizing layout. The boxes representing each sequence 610 may be distinguished by differing visual appearance, such as color, shading, etc., or by the presence of varying visual markers indicating different types of sequences. For example, each sequence 610 may be color coded as follows. A green background color may indicate a Start sequence.

Such a background color may be automatically assigned to a sequence which contains the step selected to be displayed on launch. A purple background color may indicate a standard sequence. A light blue background color may indicate a currently selected sequence. Currently selected sequence(s) may be deleted or copied via right click. However, the colors described are only exemplary and any other desired scheme for distinguishing sequences may be used.

Alternatively, as shown in FIG. 6, each sequence 610 may be distinguished by differing background shading according to the sequence type. In addition, an existing sequence may be copied to a buffer and once copied into the buffer, may be pasted into any empty area of the grid. Also, a control 660 may be provided to add a new sequence to the project.

Connections between sequences may be added by drawing or other suitable user interaction. For example, sequences 610 may be connected via clicking on circular nodes at the left (incoming) (620) and right (outgoing) (630) edges of the box representing a sequence in order to define the linear flow from sequence to sequence. Connections may have associated additional metadata such as a connection name, which may be used, for example, in voice recognition support, or connection type. Connections may be distinguished by differing color, shading or line type, or other visual distinction. For example, two-way connections 640 may be distinguished from non-linear connections 650 which have been defined within the sequence steps themselves. In one example, yellow lines may display two way connections, and red lines may display nonlinear connections. User interface controls, such as a right-click menu, etc., may be provided to delete one or more connections or to re-name connections.

Double clicking on a sequence may open the selected sequence's contents in the Sequence Editor 700.

b. Sequence Editor

Figure 7:
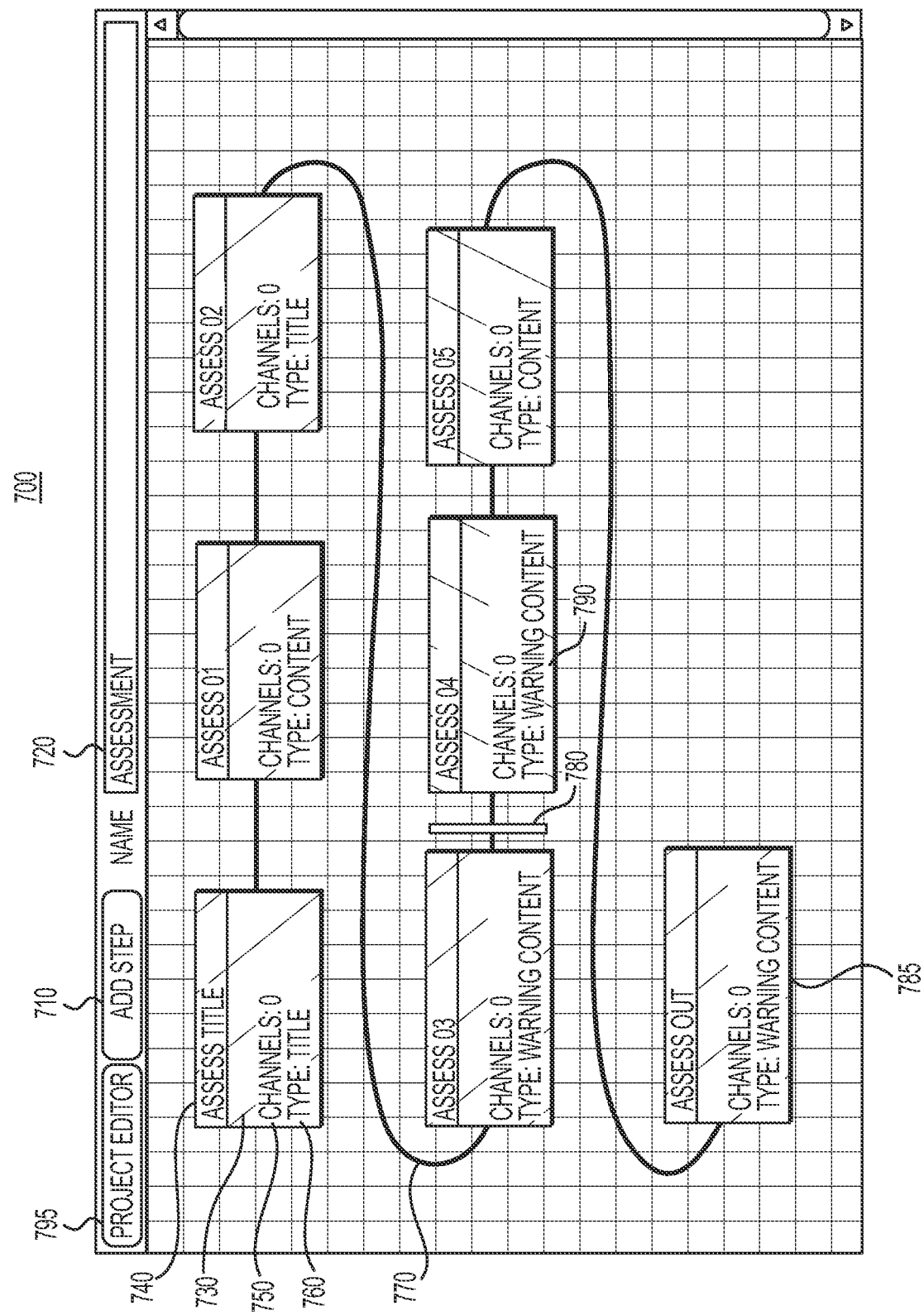
FIG. 7 depicts an exemplary user interface for specifying a sequence of steps in an augmented reality interaction, according to exemplary embodiments of the present disclosure.

As shown in FIG. 7, a "Sequence Editor" 700 may be the intermediate level of interactive visual control in the Scope SDK. The top level, "Project Editor" 600 may be accessed via the header bar 795, which also may allow the addition of new steps via the "add step" button 710, and control over the name 720 of the currently open sequence.

Each discrete Step 730 in the current sequence may be represented, for example, by boxes on a grid. Each step 730 may be analogous to a page in a book or a slide in a PowerPoint presentation. Contained within the box may be additional information about the step, such as the title of the step (740), the number of animation channels within the step (750) and the step type (template) of the step (760), etc. The start step also may be identified as such.

The step positions may be fixed into a linear flow left to right, top to bottom to represent the linear flow users experience as they click forward or backward through the content. This may be represented, for example, by connection lines 770.

Each step (or consecutive sequence of steps using 'shift click') may be re-positioned in the sequence via click and drag, which may cause an indication of an insertion point to appear indicating where the selection will insert if dropped, such as vertical placement line 780.

The boxes representing each sequence 730 may be distinguished by differing visual appearance, such as color, shading, etc., or by the presence of varying visual markers indicating different types of sequences. For example each sequence 730 may be color coded as follows:

Yellow=Start step
Grey=standard step (785)
Blue=Currently selected step(s) (790). Currently selected step(s) may be deleted or copied via right click menu.

Alternatively, as shown in FIG. 7, each step 730 may be distinguished by differing background shading according to the sequence type.

An existing sequence may be copied to a buffer and once copied into the buffer, may be pasted into the sequence. Pasted steps may be placed at the end of the current sequence unless a step is selected when right-clicking, which allows the option to "paste steps after" the selected step.

A control 710 may be provided to add a new step to the sequence.

Double clicking on a step may open the selected step's contents in the Step Editor 800.

c. Step Editor

A Step Editor 800 according to one or more embodiments may include elements to specify step properties and to specify animation properties associated with each step. These elements will be discussed in detail below with respect to FIGS. 8-10.

i. Step Properties

Figure 8:
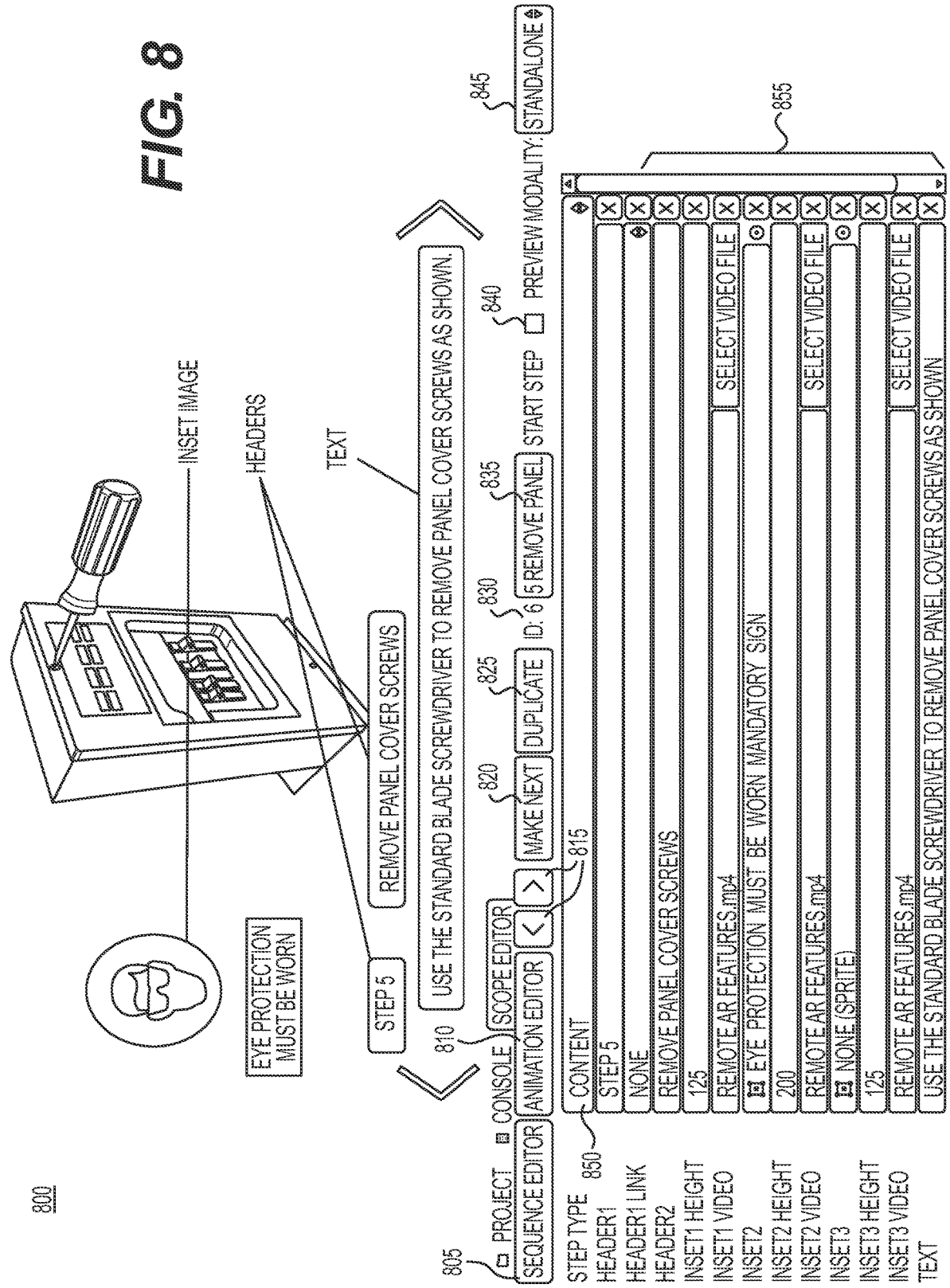
FIG. 8 depicts an exemplary user interface for specifying a step in an augmented reality interaction, according to exemplary embodiments of the present disclosure.
Figure 9:
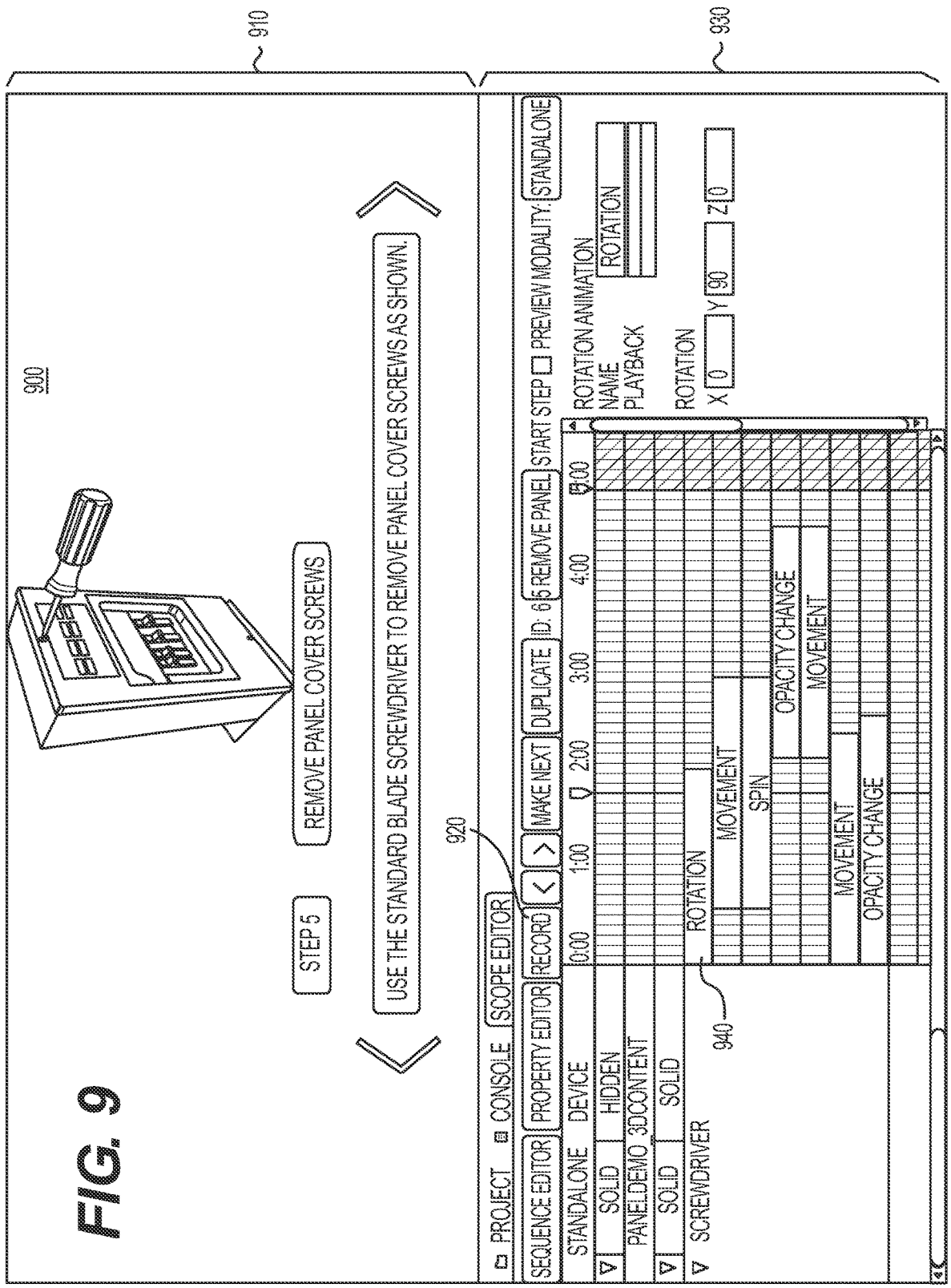
FIG. 9 depicts an exemplary user interface for specifying an animation within a step in an augmented reality interaction, according to exemplary embodiments of the present disclosure.
Figure 10:
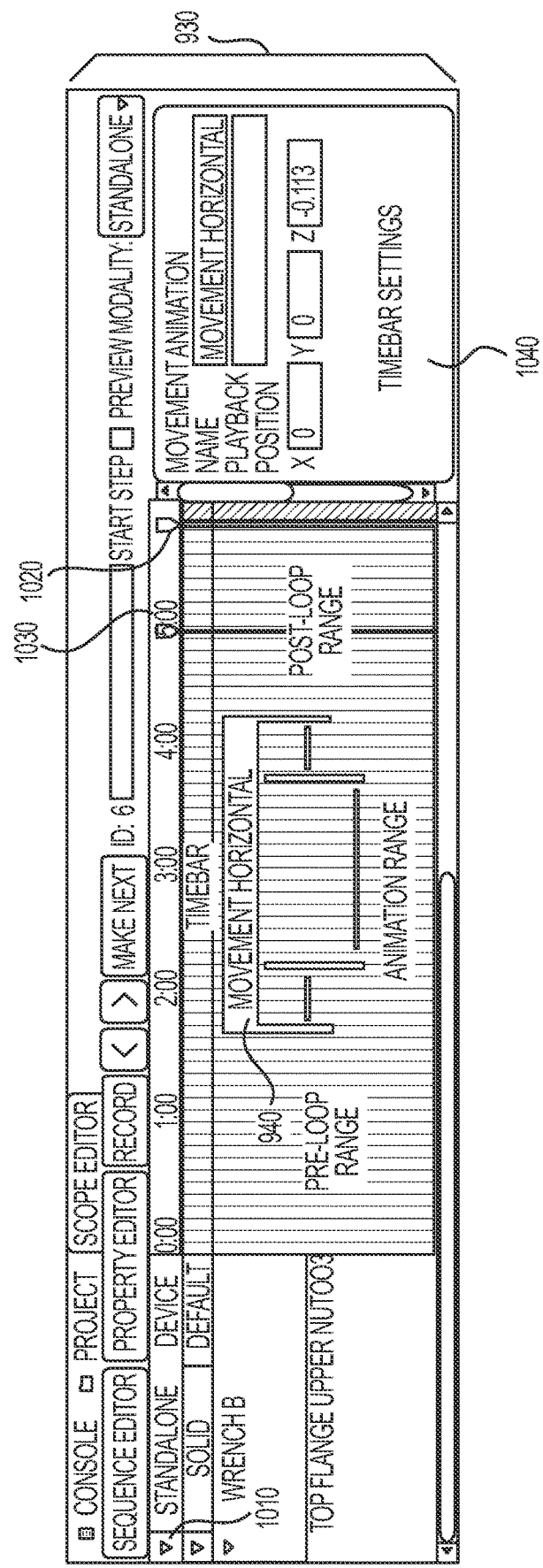
FIG. 10 depicts a detailed view of an exemplary user interface for specifying an animation within a step in an augmented reality interaction, such as the user interface of FIG. 9, according to exemplary embodiments of the present disclosure.

As shown in FIGS. 8 and 9, a "Step Editor" may be the bottom level of control in the Scope SDK, and may be presented in two distinct editor modes: The Property Editor and the Animation Editor.

Both modes may share a common header bar which may contain common components such as:

Access to the next level up, via the "Sequence Editor" button 805.

A toggle style button 810 which may allow switching between the two modes (Property Editor and Animation Editor) of the Step Editor 800.

Buttons 815 to provide access to editing the step immediately prior or following the current step, respectively. These are shown in FIGS. 8 and 9 as "<" and ">" for example, but any suitable configuration or labeling of buttons may be used.

A "Make Next" interface (820), which may create a 'following step' immediately after the current step which may be automatically configured to pick up where the current step ends.

A "Duplicate" interface (825), which may create an identical duplicate of a currently selected step immediately after the currently selected step.

An ID # indicator (830) which may provide a unique identification number which may be generated automatically for every step for absolute identification purposes.

A Step Name (835), which may be editable by the author and may not be seen by the end-user. This may be used to identify the step in the Sequence Editor.

A Start Step checkbox (840). When checked this may override any previous indication of a start step to make the current step the step which will display first upon launch of the project.

A Preview Modality indicator (845), which may allow the user to select a preview mode in which the step will be displayed, such as, for example, Standalone or Device Mode.

A Checklist Editor (not shown). As part of a step, an author may require a user to perform one or more actions, such as recording a measurement (type it in), checking off a Boolean item, or forcing the user to annotate, take a photo, or record video as proof of a proper installation for example, or potentially optical character recognition or computer vision recognition of an analog meter. This checklist can be optional or mandatory. Checklist items are sent to a cloud-based content management system for cataloging, and can be combined with analysis to drive process improvement. This also relates to the metadata (timing, user and location information being collected)

The area below this header may be unique to the two separate editor modes, Property Editor and Animation Editor According to embodiments of the present disclosure, a "Property Editor," as shown in FIG. 8, may allow the editing of the properties of the current step. Such editing may pertain to multiple aspects of the step related to a 2D user interface layer. Properties listed for editing may vary from step to step, for example, depending on what variety of properties have been defined and are currently in use. Properties listed for editing may be defined by the "Step Type" currently selected, which may indicate a template for the step.

The Step Type (850) may be a pull down or other suitable user interface element to allow the user to select from among a plurality of available templates. Each template may include one or more editable properties displayed in the property area 855.

Exemplary templates and associated properties may include:

Intro Splash: may contain "CompanyLogo", "Project Title" and "Project Subtitle" properties.

Title: may contain "Header1", "Header 2" and "Header 3", properties with associated links.

Content: may contain header bar titles and links, text description, and inset image properties (as shown in FIG. 8).

Warning Content: may contain header bar titles and links, text description, and inset image properties.

Branch/Menu: may contain numbered option headings with associated page links.

ii. Step Animations

According to embodiments of the present disclosure, an "Animation Editor" 900 may allow the editing of a user's content in 3D space specifically for a current step. While in Animation Editor mode, the header bar for the step editor may include a "Record" button 920. When the Record button 920 is clicked, the interface may enter "record mode." Such a mode may be indicated by any suitable user interface element, such as a red light or banner or a red border around the scene editor window 910. While in Record mode, the Record button 920 may be replaced by a solid red "Stop" button. Alternatively, a Stop button may be provided along side the Record button 920. While in record mode, a user may affect changes to the scene which may take place in the current step being edited. The Animation Editor may allow the user to interface with the recorded changes.

For example, a user may create an animation by clicking the Record button 920, changing the position, rotation and/or scale of an object, then clicking Stop. A timebar such as timebar 940 corresponding to the recorded animation may be displayed in the timeline area 930 of the Animation Editor and the object may be added to the currently selected visibility group.

Animation of an object may include the object's position, rotation, and temporal speed. Animation of an object also may include other animations such as movement of an individual vertex in a mesh representing the object, therefore deforming the object. An example of this type of animation might be a hose or a wire bending.

According to embodiments of the present disclosure, a user may control multiple aspects of an animation. Exemplary editable aspects are shown, for example, in FIG. 10:

The visibility of any object in the timeline area via its membership in a visibility group 1010, which may be designated as any of several visibility levels specific to the mode (device or standalone) in which the object is viewed on the current step (triggered by an image target's presence).

The specific length and placement in time of the animation (via dragging and adjusting the timebar 940).

The time at which the animation of the current step 'loops' to restart content playback (via position of the loop point marker 1020).

Interactive playback of the current step's total animation (via 'scrubbing' of the playhead marker 1030).

Specific numeric (type-in) control over animated parameters and access to an animation graph (via timebar settings 1040).

Thus, for each step, data may be associated with the step, such as images, video, text, text inputs for inputting measurements, checkboxes for listing off checklists, 3D content, etc. Each such item may be animatable. For 3D content, for example, animations may be created through the intuitive record process discussed above. Thus, a user may place content to be animated in a desired location (rotation and position) at the end of a period of time, and the Scope SDK will animate it automatically according to the beginning and ending position and orientation.

VII. Content Association

Figure 13:
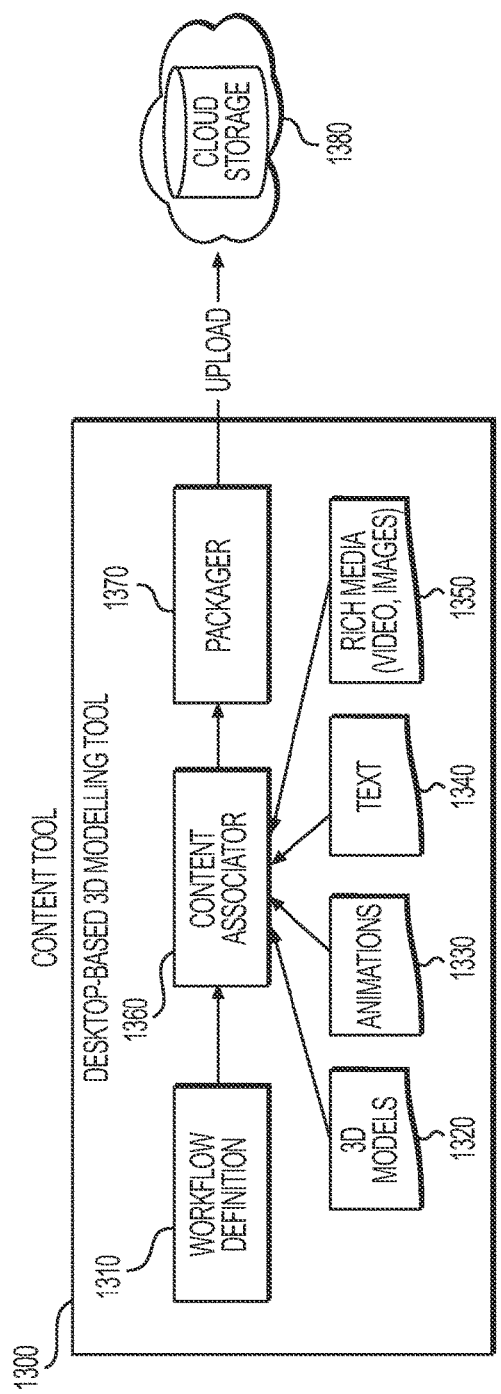
FIG. 13 depicts an exemplary environment for a content modeling tool in an augmented reality system, according to exemplary embodiments of the present disclosure.

Once the components of an AR interaction have been defined, according to embodiments of the present disclosure, those components may be provided to a content modeling tool 1300 to be prepared for deployment and storage, as shown in FIG. 13. For example, a workflow definition 1310, 3D models 1320, animations 1330, text 1340, and rich media 1350 (such as, for example, video, images, etc.) may be provided to a content associator 1360, which may form associations between content items and may provide the result to a packager 1370, which may combine the associated content into a content package to be uploaded to an appropriate storage, such as a cloud-based storage 1380.

VIII. Object Interactions

According to embodiments of the present disclosure, during the course of an animated sequence, for example, as defined within the Step Editor 800 discussed above, one or more animated 3D objects may be desired to interact with each other. This may include, for example, a tool such as a wrench interacting with hardware such as a nut. To support animation of such interactions, the Scope SDK may include definitions of a plurality of tools and other objects with predefined interaction parameters. Such object definitions are discussed in detail below with respect to FIGS. 11 and 12.

According to embodiments of the present disclosure, the Scope SDK may define tools and other objects in terms of meshes, and certain points in that mesh may interact with corresponding points in other meshes, thus providing an easily generalizable way to interface with various tool types and hardware types.

Figure 11:
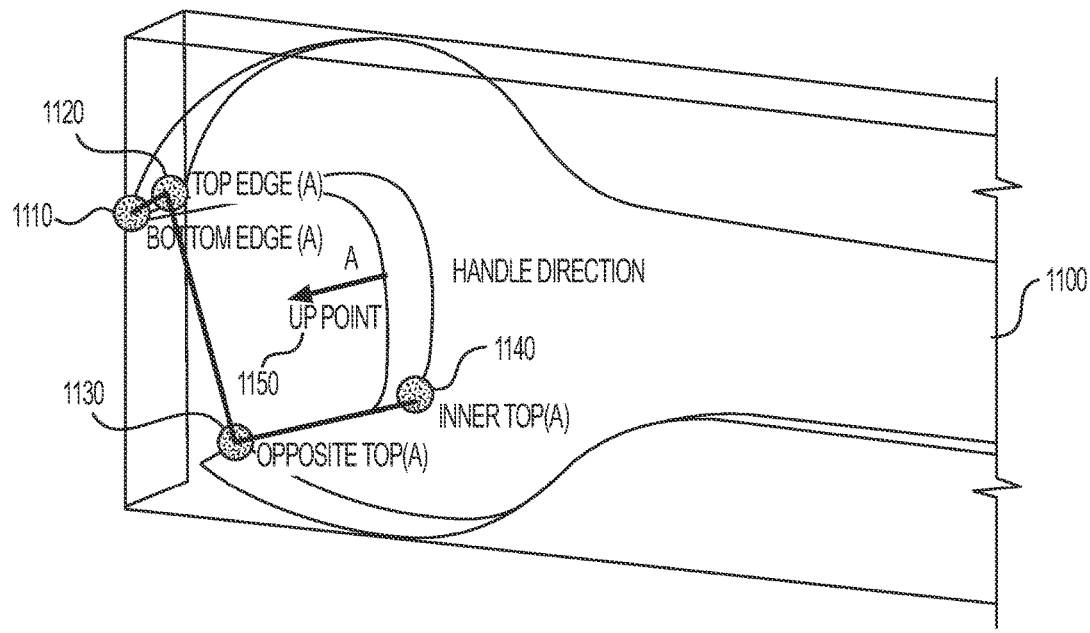
FIG. 11 depicts exemplary interaction points for manipulating a tool in an augmented reality simulation, according to exemplary embodiments of the present disclosure.

For example, the Scope SDK may define interaction points for wrench 1100, as shown in FIG. 11. An exemplary wrench model 1100 may require, for example, four defined interaction points and an angle of entry:

bottom edge 1110
top edge 1120
opposite top edge 1130 inner top 1140
handle direction A

An exemplary wrench model 1100 may also define an up point 1150.

Figure 12:
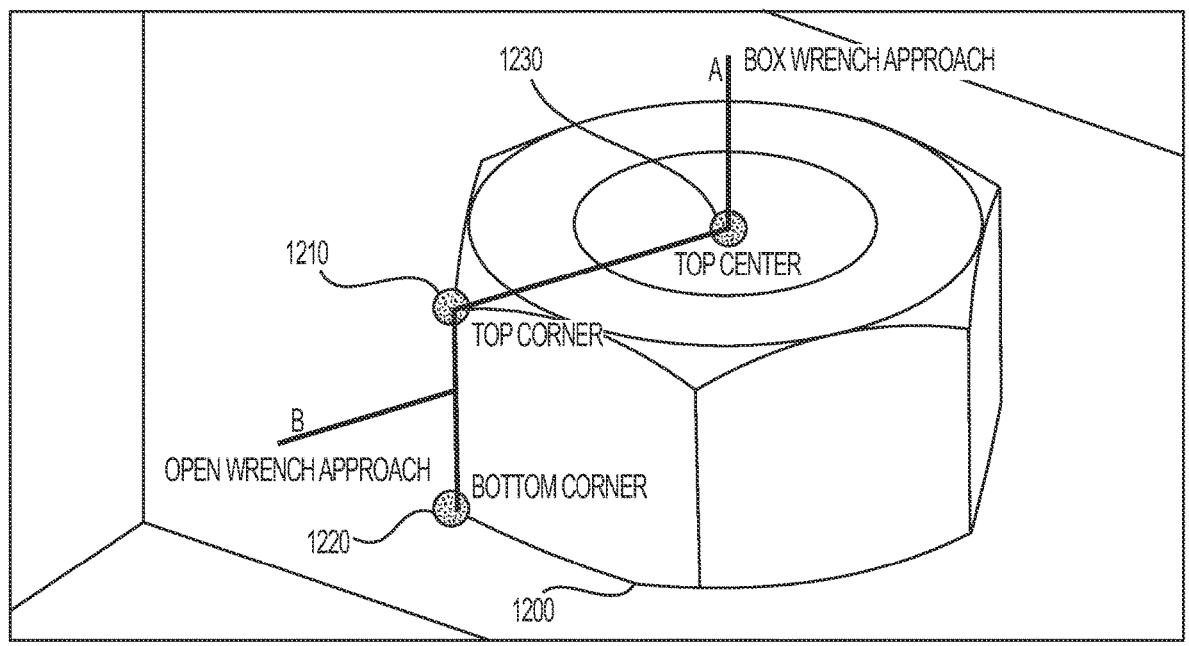
FIG. 12 depicts exemplary interaction points for manipulating an object in an augmented reality simulation, according to exemplary embodiments of the present disclosure.

These points on the wrench may interact with corresponding points on a nut 1200, as shown in FIG. 12.

An exemplary nut model 1200 may require, for example, three defined interaction points and an angle of approach:
top corner 1210
bottom corner 1220
top center 1230

These points on the nut may interact with corresponding points on a wrench 1100 as shown in FIG. 11.

In addition, an approach angle for an object may differ depending on the type of tool that may interact with the object. For example, a nut may have a different approach angle for an open wrench (approach direction B in FIG. 12) or a box wrench (approach direction A in FIG. 12).

IX. Object Recognition

Although the Scope SDK may provide predefined models for tools and other hardware objects, as discussed above, some objects encountered may not correspond to predefined objects. Accordingly, the Scope SDK may provide a mechanism to recognize such objects during an AR interaction. Two such mechanisms according to embodiments of the present disclosure are discussed below with respect to FIGS. 14 and 15.

Figure 14:
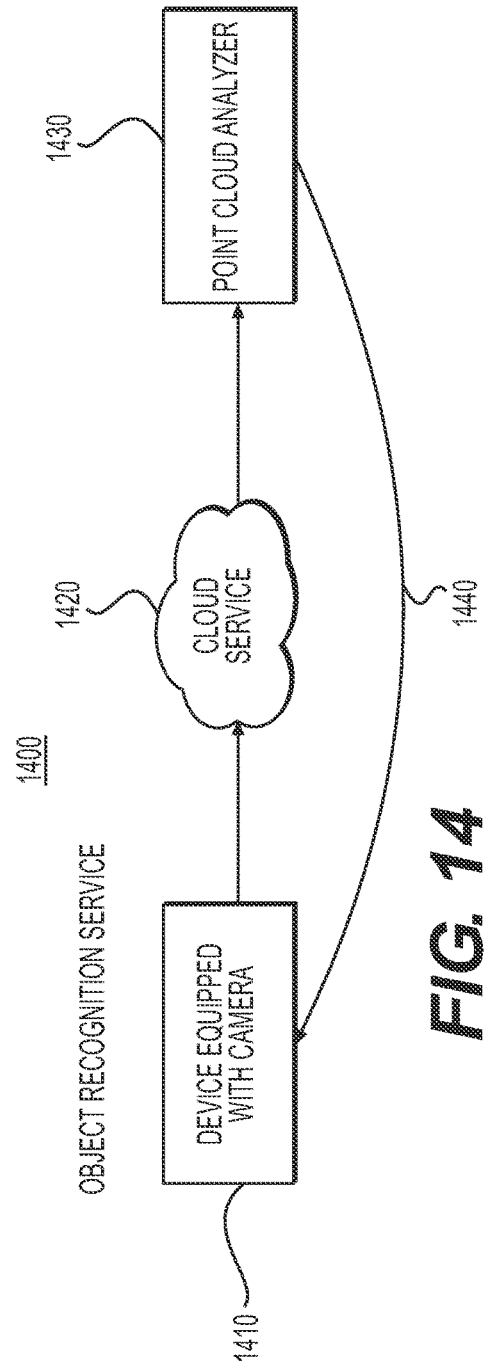
FIG. 14 depicts an exemplary environment for an object recognition service in an augmented reality system, according to exemplary embodiments of the present disclosure.

Referring to FIG. 14, in one embodiment of an Object Recognition Service 1400, an AR device equipped with a camera 1410 may capture an image of an object, may analyze the captured image to generate a point cloud representing the object and may transmit the point cloud data to a cloud service 1420. That is, for every pixel in the captured image, a depth measurement may also be present, thus possibly giving a 3D mesh for the captured image. The cloud service 1420 may provide the point cloud to a point cloud analyzer 1430, which may analyze the point cloud to match against a database of 3D object CAD models. If a matching 3D object CAD model is found in the database, then the matching CAD model may be transmitted (1440) to the device 1410 to overlay in an AR session.

Figure 15:
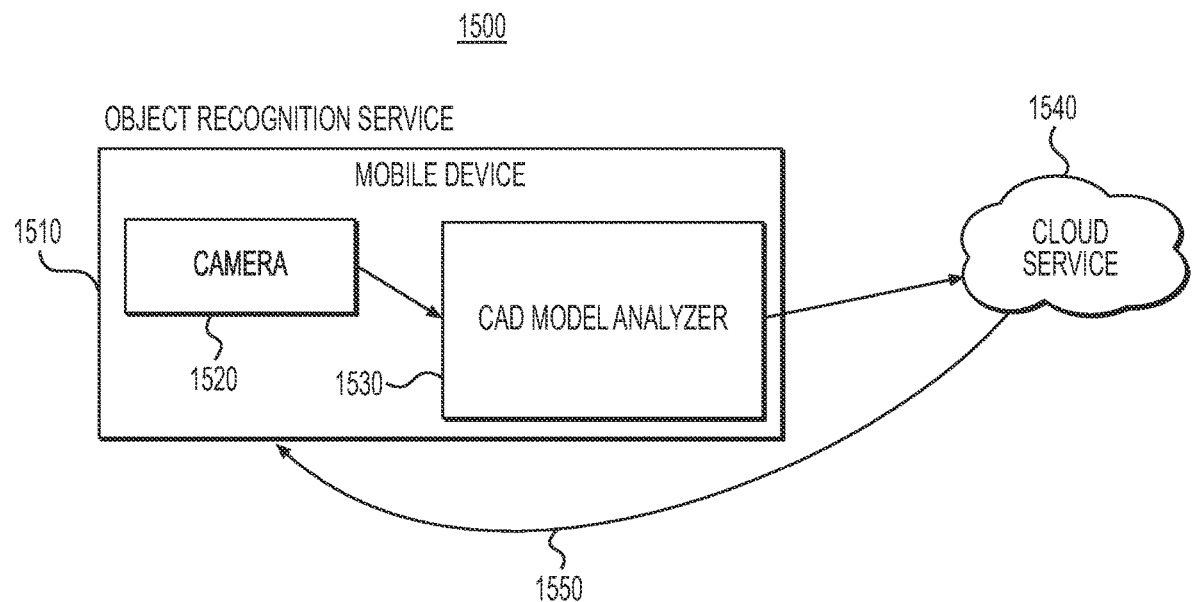
FIG. 15 depicts an exemplary environment for an object recognition service in an augmented reality system, according to exemplary embodiments of the present disclosure.

Referring to FIG. 15, in another embodiment of an Object Recognition Service 1500, a mobile device 1510 equipped with a camera 1520 may capture an image of an object and may provide the captured image to a CAD model analyzer 1530. The CAD model analyzer 1530 may analyze the captured image to match against a database of known object CAD models. If a matching object CAD model is found in the database, then the matching CAD model may be transmitted (1550) to the cloud service 1540 and then back to the mobile device 1510 to overlay in an AR session.

X. Use Cases

The following additional use cases illustrate alternative embodiments of the present disclosure.

a. Remote AR "LIGHT"

One or more embodiments of the present disclosure may allow for immediate deployment of the Remote AR solutions for any company, regardless of the amount of content that they have ready to integrate into the solution. For example, in the event that the remote expert would like to support a user in the field but the equipment does not have any associated 3D models for the remote expert to integrate in AR and show the local user (e.g., a technician) what the proper steps are, the remote expert may use generic guidance content (arrows, highlights, basic shapes and animations, telestration by drawing with a finger or mouse, etc.). This may allow for extremely rapid and immediate deployment of the Remote AR application with little or no requirements for specific models or 3D content.

b. Remote AR "Enterprise Version"

One or more embodiments of the present disclosure may allow a technician to connect with a remote expert for support. According to such an embodiment, the remote expert may have access to many specific 3D models and content from a library that may be specifically associated with the company and their equipment. Such a library may consist of hundreds or thousands of parts all categorized for easy query. According to such an embodiment, the remote expert may be able to deploy specific 3D models associated with the object, as well as guidance AR content. Such an embodiment may be part of the larger AR authoring platform that may provide many additional features that the expert could integrate, including the immediate deployment of an AR sequence (if it already exists) that the remote expert could add to, to further support the local user (e.g., a technician).

c. Remote AR "Consumer Version"

One or more embodiments of Remote AR may become a tool that connects "experts/hobbyists" from around the world. For example, as a consumer is working on his electronic appliance, motor, mechanical item, craft, or anything he could use help with, the user may be able to post what he needs help with (or otherwise solicit assistance) and connect with an "expert" from a live list of connections. Depending on the model, the expert may be able to remotely access 3D parts that could be integrated into the solution directly from the manufacturer to help assist in the remote support. For those parts that are not accessible, the user may be able to use generic instructional support content.

d. Additional Embodiments of Remote AR

Additional embodiments of Remote AR may include providing a toolset to minimize the requirements for service experts to support technicians or consumers by travelling to the site. This may in turn result in minimized downtime of equipment, reduction in human error, and ultimately significant cost savings.

Such an embodiment may include immediate recognition from the user's camera as to what the object or equipment is (Object Recognition). This tool may quickly search a database (e.g., a cloud database) that may be either specific to the organization, or populated by the consumer users.

In the event that the camera view does not recognize the equipment, the application may then immediately map the object creating its own point cloud model and thereby possibly allowing for alignment for the AR content. There may be no need at that point for 2D markers. The remote expert then may be able to interact with either existing content or rapidly support through their own instructional content. Additional features of such an embodiment may include recording and photos to capturing the process and support for accountability. Moreover, voice commands may be used to navigate the entire process, as well as to control content. The application then may immediately recognize the type of hardware being used by both the user and the remote expert, and adapt according to specs of the hardware and Operating System. This could include tablets, smart phones, and AR glasses (both monocular and binocular), and even contact lenses.

Embodiments of the present disclosure may provide maintenance (e.g., automotive, machinery, aircraft, etc.) support through the use of the above-described Remote AR application, which seeks to connect (e.g., in real time) the consumer or technician with an expert for live and/or pre-recorded support in an augmented reality view.

According to certain aspects of the disclosure, methods are disclosed for interaction using augmented reality. For example, one method comprises: loading an augmented reality (AR) workflow from storage; loading image of a workspace from a camera; executing a step of the AR workflow; completing a task corresponding to the step of the AR workflow in the workspace; analyzing the workspace image to detect completion of a task; and analyzing the workspace image to detect deviation from an expected state.

The method may further comprise recording metadata of the interaction.

The recorded metadata may include one or more of identities of the remote user and a local user, an elapsed time for completion of a task in the AR interaction, measurements of values related to the task in the AR interaction, check list items associated with the task in the AR interaction, and screenshots of the AR interaction.

The workflow may be loaded from cloud storage.

The method may further comprise recognizing an object in the image.

The recognizing the object in the image may comprise determining a known object model corresponding to the object in the image from a database of object models.

The workflow may be stored as extensible markup language (XML) data.

According to certain aspects of the disclosure, systems are disclosed for interaction using augmented reality. For example, one system comprises: a camera to capture a video image; an augmented reality (AR) toolkit to receive the captured video image and generate AR coordinates; a first renderer to receive the captured video image and the generated AR coordinates and update a scene's camera view according to the generated AR coordinates; a video encoder to encode the captured video image and transmit the encoded video image to the first renderer, wherein the first renderer combines the generated AR coordinates, data for one or more 3D objects, and the encoded video frame into first combined data, serializes the first combined data to a second rendered by way of a network, and receives second combined data from the second renderer by way of the network.

The 3D object may represent a tool and the data for the 3D object may include a plurality of interaction points for interfacing the represented tool with another 3D object.

The imaging device may capture depth pixels in addition to image pixels.

The first renderer may record metadata of the first combined data.

According to another aspect of the disclosure, a method for interaction using augmented reality may comprise: capturing a video image using a camera; generating augmented reality (AR) coordinates corresponding to the captured image; updating a scene camera view according to the generated AR coordinates; encoding the captured video image; combining the generated AR coordinates, one or more 3D objects, and the encoded video image; transmitting combined data to remote user; and receiving from remote user updated AR coordinates, 3D objects, and video image.

The method may further comprise determining a step type of a step among the plurality of steps.

The properties defined for a step may be determined by the step type determined by the step.

The properties of each step may include one or more of images, video, text, text inputs for inputting measurements, checkboxes for listing of checklists, and 3D objects to be displayed for the step.

The animations for each step may include a position, a rotation, and a temporal speed for an object displayed for the step.

The animations of the object may be determined by recording manipulations of the object.

The method may further comprise determining a loop point at which the defined animation is repeated.

The method may further comprise determining a sequence order of plurality of steps.

The properties of an object to be displayed for the step may include a location and orientation of the object.

Other embodiments of the present disclosure may be used, for example, with unmanned aerial, land or underwater drones. In such an embodiment, the local user may be a camera mounted on a drone, with an operator viewing its field of view on a tablet. A remote expert may be able to view the drone's and the operator's field of view, augmenting it with the content described above. For example, an engineering firm might use a drone to prospect land for development. Using real time augmentation, remote experts located in an office building may interact in real time, showing 3D models of buildings or other developments, while also adding arrows or drawing to instruct the operator to move the drone to a new perspective, or to simply collaborate with other remote experts in real time.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of interaction using augmented reality, the method comprising:
capturing, by a local user, a live video image using an imaging device;
generating first augmented reality (AR) coordinates corresponding to the live video image;
generating, by the local user, first user-generated annotations;
registering the first user-generated annotations to the live video image;
transmitting, by the local user, the first AR coordinates, first user-generated annotations, and live video image to a remote user;
receiving, by the local user, second user-generated annotations and second AR coordinates from the remote user;
viewing, by the local user, the generated first user-generated annotations, the identification of the identified object depicted in the live video image, and the received second user-generated annotations registered to the live video image according to the second AR coordinates; and
receiving, from the remote user, an indication of automatically detected changes in the scene depicted in the live video image, the automatically detected changes in the scene corresponding to predetermined conditions, wherein the automatically detected changes in the scene include one or more of: addition or removal of a portion of an assembly depicted in the live video image, damage to an object depicted in the live video image, one or more sensor values matching or deviating from predetermined expected values, or a completed assembly matching a predetermined configuration, wherein the viewing is performed on a device chosen from a group including a tablet, a mobile phone, a laptop computer, a head-mounted display, and a virtual-reality display.

2. The method of claim 1, wherein each step of the method is repeated for each task in the predefined workflow.

3. The method of claim 1, wherein the second user generated annotations comprise an identification of an object depicted in the live video image and information about the identified object.

4. The method of claim 1, further comprising recording metadata of the interaction.

5. The method of claim 4, wherein the recorded metadata includes one or more of identities of the remote user and the local user, an elapsed time for completion of a task in an AR interaction, measurements of values related to the task in the AR interaction, check list items associated with the task in the AR interaction, and screenshots of the AR interaction.

6. The method of claim 1, wherein the receiving and viewing operations are performed in real time or in near-real time.

7. The method of claim 1, further comprising transmitting between the local user and the remote user audio, video, or other data.

8. The method of claim 1, wherein the received second user-generated annotations are registered to a position in the live video image.

9. The method of claim 1, wherein the remote user controls the imaging device to determine a level of detail captured by the imaging device.

10. The method of claim 1, further comprising:
transmitting, by the local user, the first AR coordinates, first user-generated annotations, and the live video image to a second remote user; and
receiving, by the local user, third user-generated annotations and third AR coordinates from the second remote user.

11. The method of claim 1, further comprising:
selecting, by the local user, an expert among a plurality of experts as a remote user, each expert among the plurality of experts being associated with metadata describing one or more attributes of the respective expert.

12. The method of claim 1, further comprising:
automatically analyzing, by a computer algorithm, the live video image to detect completion of a task in a predefined workflow; and automatically analyzing, by the computer algorithm, the live video image to detect a deviation from an expected state in the predefined workflow.

13. A method of interaction using augmented reality, the method comprising:
capturing, by a local user, a live video image using an imaging device;
generating augmented reality (AR) coordinates corresponding to the live video image;
updating a scene view according to the generated AR coordinates; encoding the live video image;
loading first 3D object information from external storage;
combining the AR coordinates, first 3D object information, and encoded live video image, to generate combined data;
transmitting, by the local user, the combined data to a remote user;
receiving, from the remote user, updated combined data including second 3D object information;
viewing, by the local user, the updated combined data and the identification of an object depicted in the live video image on a device chosen from a group including a tablet, a mobile phone, a laptop computer, a head-mounted display, and a virtual-reality display; and
receiving, from the remote user, an indication of automatically detected changes in the scene depicted in the live video image, the automatically detected changes in the scene corresponding to predetermined conditions, wherein the automatically detected changes in the scene include one or more of: addition or rem oval of a portion of an assembly depicted in the live video image, damage to an object depicted in the live video image, one or more sensor values matching or deviating from predetermined expected values, or a completed assembly matching a predetermined configuration.

14. The method of claim 13 wherein each step of the method is repeated for each task in the predefined workflow.

15. The method of claim 13, wherein the second 3D object information comprises an identification of an object depicted in the live video image and information about the identified object.

16. The method of claim 13, further comprising recording metadata of the interaction.

17. The method of claim 16, wherein the recorded metadata includes one or more of identities of the remote user and the local user, an elapsed time for completion of a task in an AR interaction, measurements of values related to the task in the AR interaction, check list items associated with the task in the AR interaction, and screenshots of the AR interaction.

18. The method of claim 13, further comprising transmitting between the local user and the remote user audio, video, or other data.

19. A method of interaction using augmented reality, the method comprising:
receiving, from a remote user, combined data comprising augmented reality (AR) coordinates, information of first 3D objects, and an encoded live video frame;
updating a background image based on the encoded live video frame;
updating a scene view according to the AR coordinates;
updating positions and existence of the first 3D objects;
loading 3D content from external storage;
creating a first updated rendered view by combining the loaded 3D content and the background image;
viewing the first updated rendered view on a device chosen from a group including a tablet, a mobile phone, a laptop computer, a head-mounted display, and a virtual-reality display;
generating second 3D object information; creating a second updated rendered view by combining the second 3D object information and the background image;
returning, to the remote user, the second updated rendered view to the remote user;
automatically analyzing, by a computer algorithm, the encoded live video frame to detect completion of a task in a predefined workflow; and
automatically analyzing, by the computer algorithm, the encoded live video frame to detect a deviation from an expected state in the predefined workflow.

20. The method of claim 19, wherein each step of the method is repeated for each task in the predefined workflow.

21. The method of claim 19, further comprising recording metadata of the interaction.

22. The method of claim 21, wherein the recorded metadata includes one or more of identities of the remote user and the local user, an elapsed time for completion of a task in an AR interaction, measurements of values related to the task in the AR interaction, check list items associated with the task in the AR interaction, and screenshots of the AR interaction.

23. The method of claim 19, wherein operations of the method are performed in real time or in near-real time.

24. The method of claim 19, further comprising transmitting between the local user and the remote user audio, video, or other data.

25. The method of claim 19, wherein the second updated rendered view comprises an identification of an object depicted in the live video image and information about the identified object.

* * * * *